(12) United States Patent
Tsujimura et al.

(10) Patent No.: US 10,553,061 B2
(45) Date of Patent: Feb. 4, 2020

(54) AUTHENTICATION INFORMATION CONTROL SYSTEM, AUTHENTICATION INFORMATION CONTROL METHOD, AND NON-TRANSITORY COMPUTER-READABLE RECORDING MEDIUM

(71) Applicant: TOYOTA JIDOSHA KABUSHIKI KAISHA, Toyota-shi (JP)

(72) Inventors: Hiroko Tsujimura, Nagoya (JP); Kei Kanaoka, Nagoya (JP); Shun Maeda, Nisshin (JP); Yoshihiro Murozaki, Nisshin (JP); Daiki Kaneichi, Nisshin (JP); Kuniaki Jinnai, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/208,921

(22) Filed: Dec. 4, 2018

(65) Prior Publication Data
US 2019/0180546 A1 Jun. 13, 2019

(30) Foreign Application Priority Data
Dec. 12, 2017 (JP) .................................. 2017-237785

(51) Int. Cl.
*G07C 9/00* (2006.01)
*G06F 21/31* (2013.01)

(52) U.S. Cl.
CPC ......... *G07C 9/00896* (2013.01); *G06F 21/31* (2013.01); *G07C 9/00309* (2013.01); *G07C 2009/0092* (2013.01); *G07C 2009/00436* (2013.01)

(58) Field of Classification Search
CPC ................ G06F 21/31; G07C 9/00896; G07C 2009/0092
USPC ......................................................... 340/5.7
See application file for complete search history.

(56) References Cited

U.S. PATENT DOCUMENTS

| 2012/0323717 | A1* | 12/2012 | Kirsch | G06Q 20/0855 |
|---|---|---|---|---|
| | | | | 705/26.1 |
| 2018/0130159 | A1* | 5/2018 | High | G05D 1/0088 |
| 2019/0085616 | A1* | 3/2019 | Soufflet | E05B 47/0001 |

FOREIGN PATENT DOCUMENTS

JP 2006-206225 8/2006

* cited by examiner

*Primary Examiner* — Vernal U Brown
(74) *Attorney, Agent, or Firm* — Oblon, McClelland, Maier & Neustadt, L.L.P.

(57) ABSTRACT

A control unit issues temporary authentication information for disabling a locking/unlocking process to a user terminal satisfying a first condition. The control unit determines whether first authentication information has been issued to another user terminal, issues second authentication information to the user terminal to which the temporary authentication information has been issued when the first authentication information has not been issued to another user terminal, and issues the second authentication information to the user terminal to which the temporary authentication information has been issued with detection of ending of use of the first authentication information in another user terminal as a trigger when the first authentication information has been issued to the other user terminal.

7 Claims, 12 Drawing Sheets

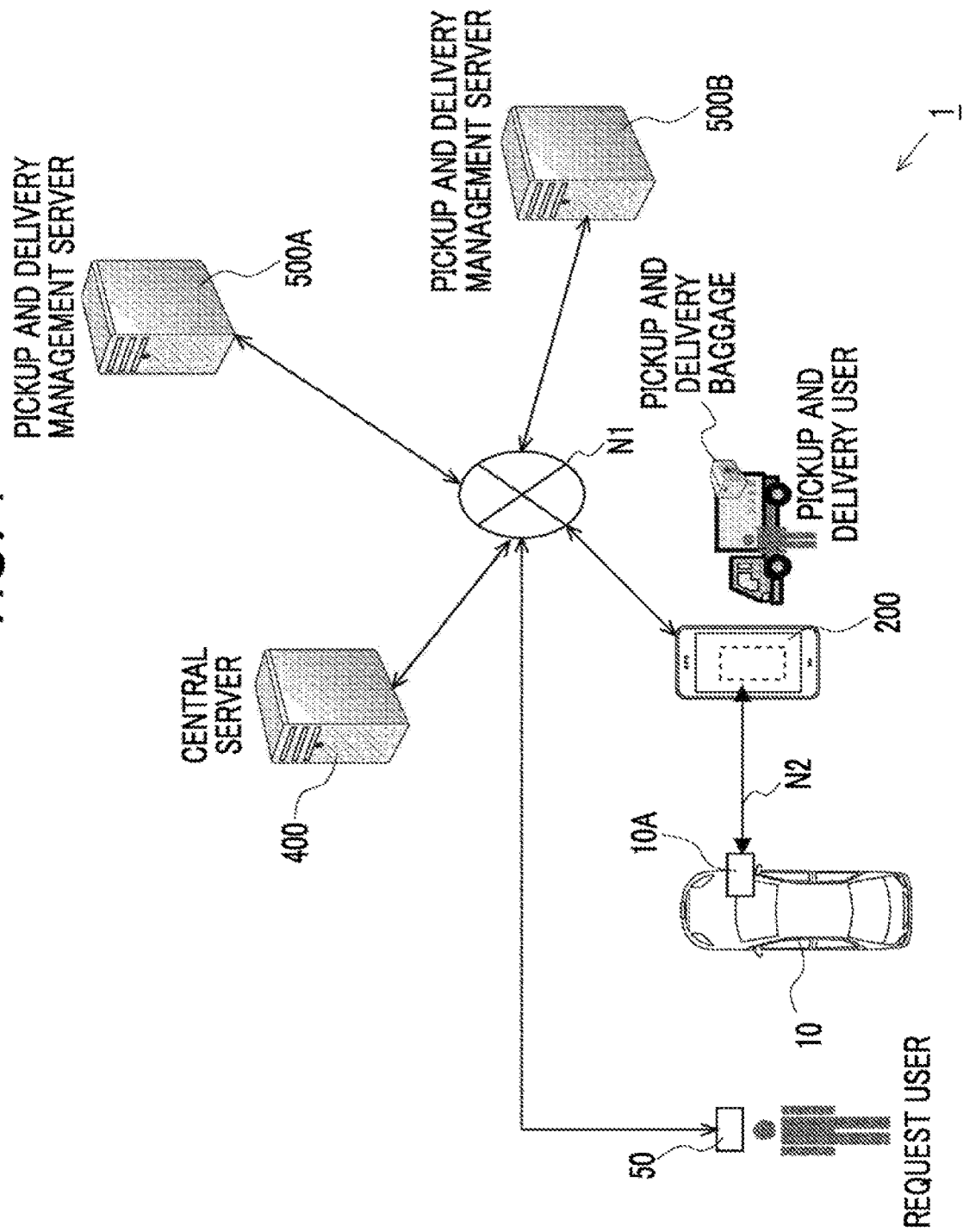

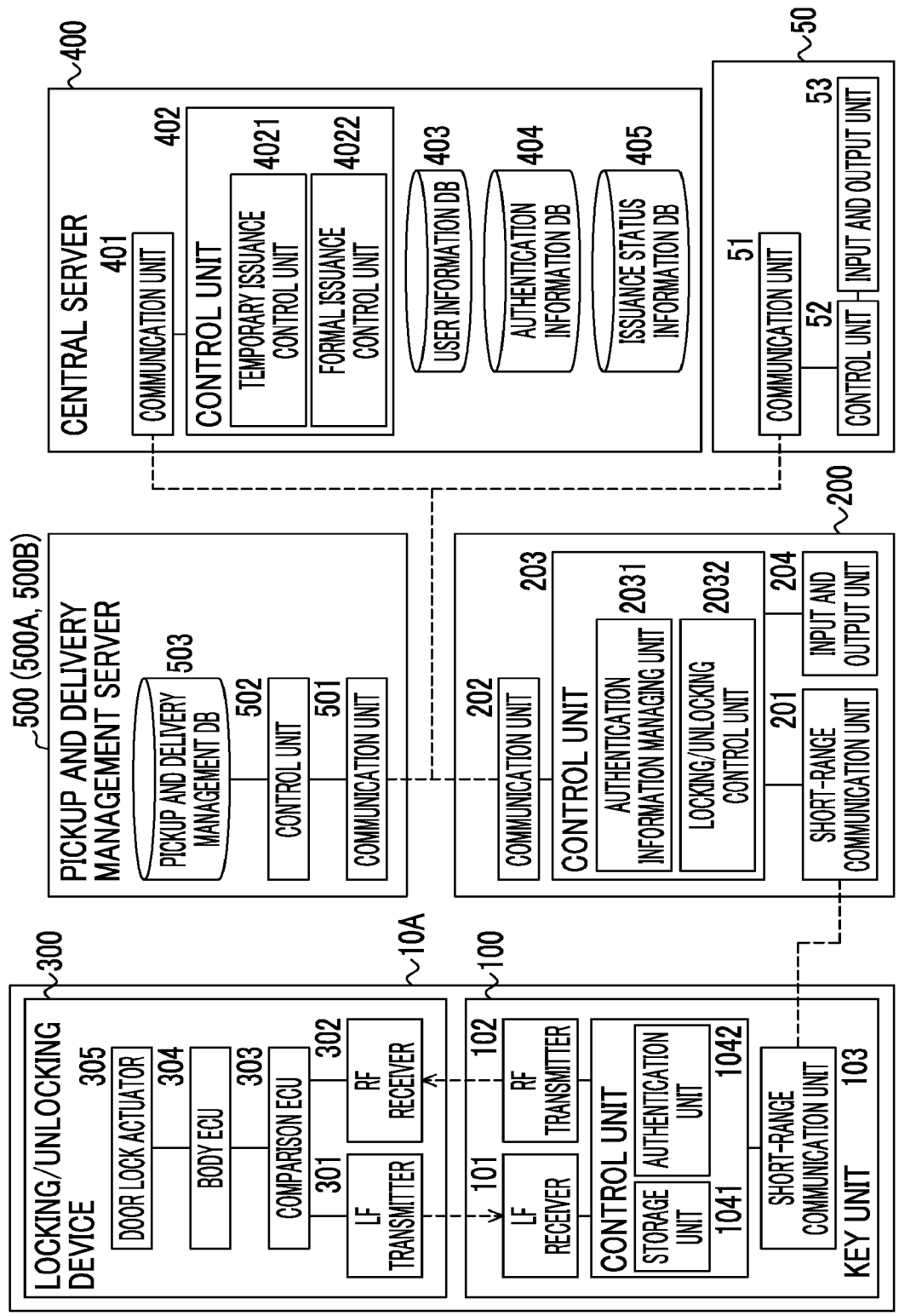

FIG. 3

| REQUEST USER ID | BAGGAGE ID | DISTINCTION BETWEEN PICKUP AND DELIVERY | PICKUP AND DELIVERY DATE AND TIME | PICKUP AND DELIVERY PLACE | PICKUP AND DELIVERY STATUS | BAGGAGE ATTRIBUTES | PICKUP AND DELIVERY USER TERMINAL ID |
|---|---|---|---|---|---|---|---|
| S001 | H001 | DELIVERY | 01/11/2017 12:00–15:00 | VEHICLE | NOT COMPLETED | ... | A001 |
| S001 | H002 | PICKUP | 02/11/2017 09:00–12:00 | VEHICLE | NOT COMPLETED | ... | A002 |
| S001 | H003 | DELIVERY | 10/10/2017 12:00–15:00 | VEHICLE | NOT COMPLETED | ... | A003 |

FIG. 4

| REQUEST USER ID | VEHICLE MODEL | COLOR | NUMBER | VEHICLE POSITION |
|---|---|---|---|---|
| S001 | ... | WHITE | XXYY | ... |

FIG. 5

| REQUEST USER ID | BAGGAGE ID | PICKUP AND DELIVERY DATE AND TIME | KEY ISSUANCE STATUS | PICKUP AND DELIVERY AGENT ID | PICKUP AND DELIVERY USER TERMINAL ID |
|---|---|---|---|---|---|
| S001 | H001 | 01/11/2017 12:00-15:00 | DURING FORMAL ISSUANCE | A | A001 |
| S001 | J001 | 01/11/2017 12:00-15:00 | DURING TEMPORARY ISSUANCE | B | B001 |
| S001 | K001 | 01/11/2017 12:00-15:00 | DURING WAITING FOR FORMAL ISSUANCE | C | C001 |

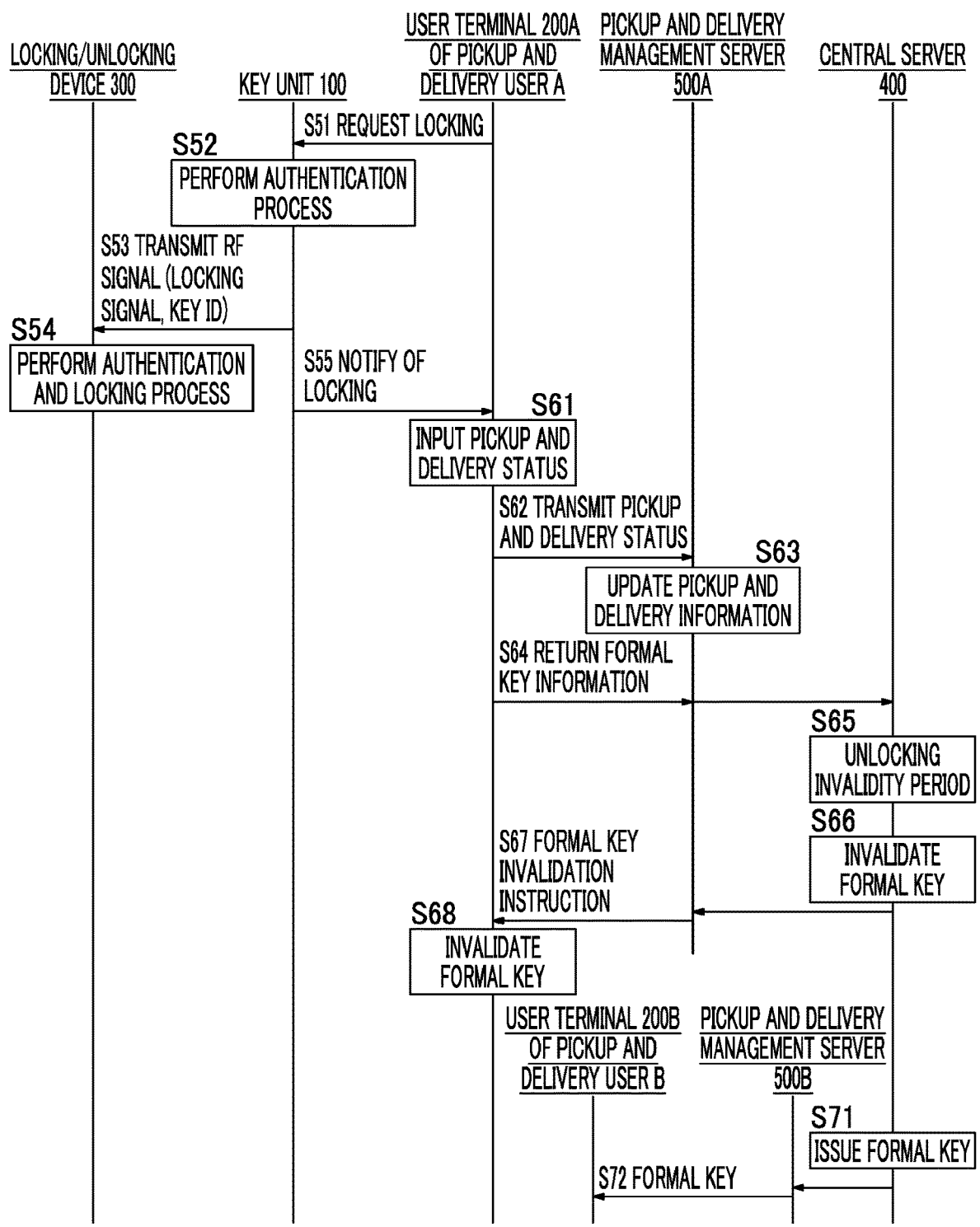

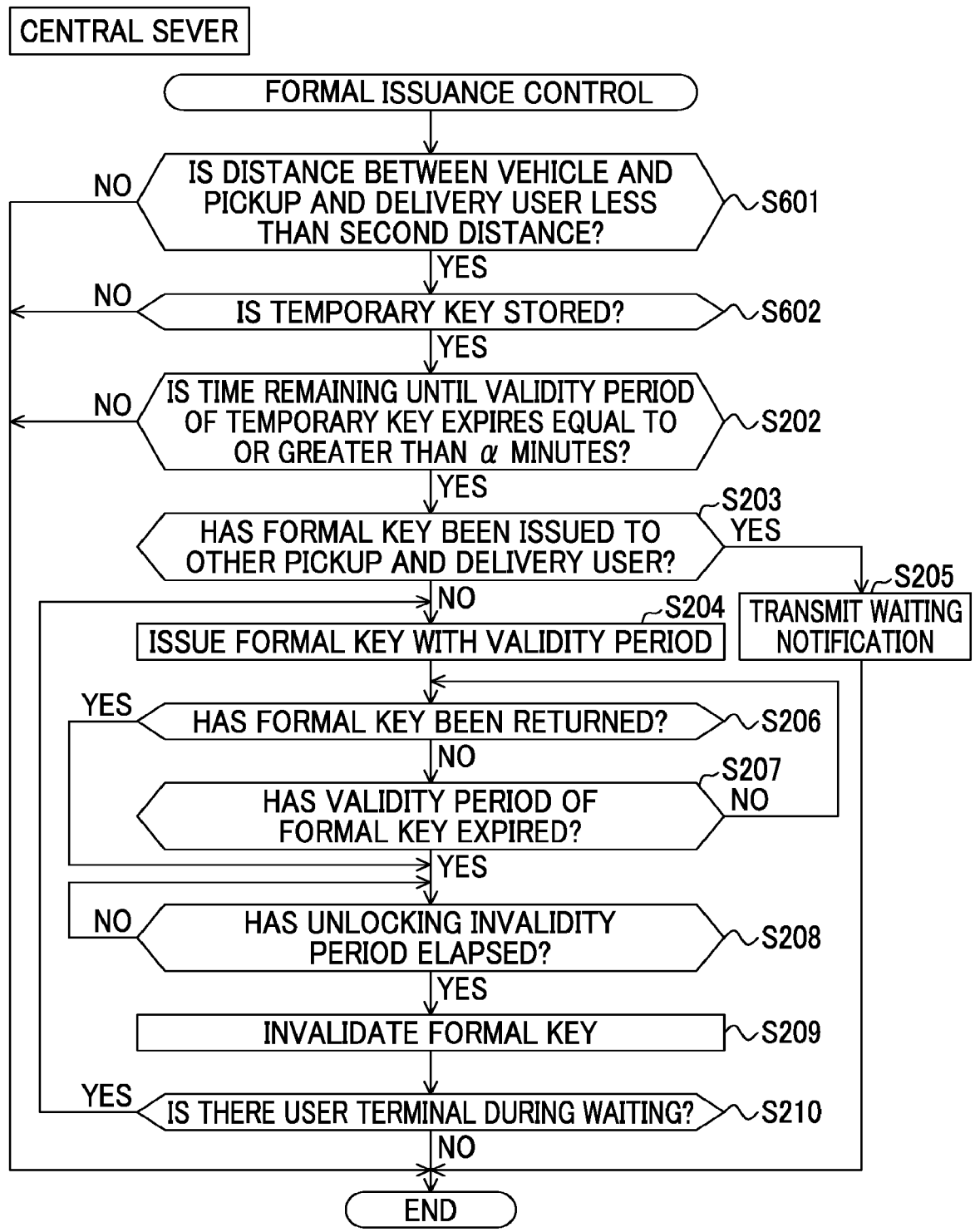

AUTHENTICATION INFORMATION CONTROL SYSTEM, AUTHENTICATION INFORMATION CONTROL METHOD, AND NON-TRANSITORY COMPUTER-READABLE RECORDING MEDIUM

INCORPORATION BY REFERENCE

The disclosure of Japanese Patent Application No. 2017-237785 filed on Dec. 12, 2017 including the specification, drawings and abstract is incorporated herein by reference in its entirety.

BACKGROUND

1. Technical Field

The disclosure relates to an authentication information control system, an authentication information control method, and a non-transitory computer-readable recording medium that control a user's access to a predetermined area in a vehicle configured to be lockable/unlockable by issuance of authentication information for permitting locking and unlocking of the vehicle.

2. Description of Related Art

Recently, a trunk-sharing system in which a cargo compartment or a passenger compartment of a vehicle which is designated by a user is used as a pickup and delivery place of a delivery object has been developed as means for efficiently performing pickup and delivery of a delivery object (baggage) between a user of a pickup and delivery service and a delivery company carrying out pickup and delivery. For example, Japanese Unexamined Patent Application Publication No. 2006-206225 (JP 2006-206225 A) has proposed a system that performs an authentication process between a pickup and delivery communication device of a delivery company and a vehicle communication device mounted in a designated vehicle and permits locking and unlocking of the designated vehicle when the authentication has succeeded at the time of pickup and delivery of a delivery object.

SUMMARY

In a system that performs pickup and delivery of baggage using a vehicle like the trunk-sharing system, when one vehicle is used by a plurality of users, the vehicle is often used on a subscription basis. That is, a plurality of users cannot often simultaneously use a vehicle. Accordingly, for example, in a trunk-sharing system, when a user of a pickup and delivery service has designated a pickup and delivery time period in a vehicle for one delivery company, other delivery companies may not perform pickup and delivery for the vehicle in the designated pickup and delivery time period.

The disclosure provides a technique capable of contributing to improvement in the degree of freedom in time of a user's access to a predetermined area in a vehicle configured to be lockable and unlockable in a system that controls the user's access to the predetermined area by issuance of authentication information for enabling locking and unlocking thereof.

The applicant has achieved the above-mentioned objective by controlling the timing at which authentication information is issued such that temporal restrictions of an access to a predetermined area in a vehicle decrease for each of a plurality of users who intends to access the predetermined area in the vehicle.

More specifically, according to a first aspect of the disclosure, there is provided an authentication information control system that controls a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the authentication information control system including a control unit. The control unit is configured to issue temporary authentication information for disabling the locking/unlocking process using the locking/unlocking control device to a user terminal satisfying a first condition. The control unit is configured to determine whether first authentication information has been issued to another user terminal when a distance between the user terminal to which the temporary authentication information has been issued and the vehicle or the facility becomes less than a first distance, to issue second authentication information to the user terminal to which the temporary authentication information has been issued when the first authentication information has not been issued to another user terminal, and to issue the second authentication information to the user terminal to which the temporary authentication information has been issued with detection of ending of use of the first authentication information in another user terminal as a trigger when the first authentication information has been issued to the other user terminal.

Authentication information is issued to only a user terminal to which the temporary authentication information has been issued. Among a plurality of user terminals to which the temporary authentication information has been issued, the authentication information can be issued to a user terminal which approaches the vehicle earlier. Accordingly, a user terminal can acquire the authentication information at a time at which the user terminal approaches the vehicle without being temporarily restricted as long as the temporary authentication information has been issued to the user terminal, and it is thus possible to improve a degree of freedom in time of a user's access to a predetermined area in the vehicle. For example, in a pickup and delivery time period such as a time period of 12:00 to 14:00, when the first authentication information is issued to a user terminal to which the temporary authentication information has been issued but use of the first authentication information in the user terminal ends, the second authentication information can be issued to another user terminal to which the temporary authentication information has been issued. That is, when there is a plurality of user terminals to which the temporary authentication information has been issued in a pickup and delivery time period, authentication information can be sequentially issued to one or more user terminals in the pickup and delivery time period and thus, for example, a user who requests pickup and delivery of baggage can designate one pickup and delivery time period and request pickup and delivery of a plurality of pieces of baggage.

For example, when a use is a pickup and delivery user who picks up and delivers baggage, the first condition is that it is the day of a scheduled pickup and delivery day of baggage or the day before or that the distance between the vehicle and the user terminal is less than a predetermined distance. The predetermined distance in the first condition is, for example, a distance which is larger than the first distance.

By issuing the temporary authentication information to a user terminal satisfying the first condition and issuing the authentication information to only the user terminal to which the temporary authentication information has been issued, it is possible to manage or control the number of user terminals which can access a predetermined area in the vehicle by days or hours.

The first distance is, for example, a predetermined distance at which a user can access the vehicle and a distance by which a user terminal can perform predetermined short-range radio communication. The predetermined short-range radio communication is used, for example, to transmit authentication information to a locking/unlocking control device mounted in the vehicle. That is, when a user arrives at the vehicle and is going to access a predetermined area in the vehicle, the authentication information is issued to the user terminal and the user can smoothly access the predetermined area in the vehicle.

In the aspect, the control unit may be configured not to perform a process of invalidating the second authentication information on the user terminal until a predetermined time elapses after ending of use of the second authentication information in the user terminal has been detected. In this configuration, the user terminal may invalidate an unlocking process using the locking/unlocking control device and validate a locking process in a period of time from detection of ending of use of the second authentication information in the user terminal to execution of the process of invalidating the second authentication information. Ending of use of the second authentication information in the user terminal is detected, for example, when the validity period of the second authentication information expires and when a predetermined operation indicating ending of use of the second authentication information is input to the user terminal by the user.

Until a predetermined time elapses after ending of use of the second authentication information in the user terminal has been detected, the user terminal cannot unlock the predetermined area in the vehicle but can lock the predetermined area. Accordingly, for example, even after a predetermined operation indicating ending of use of the second authentication information is input to the user terminal in a state in which the user has forgotten to lock the predetermined area in the vehicle, the user can lock the predetermined area in the vehicle and it is thus possible to maintain security of the vehicle.

In the aspect, the control unit may be configured to set a validity period of the second authentication information at the same time as issuing the second authentication information to the user terminal and to detect ending of use of the second authentication information in the user terminal when the validity period expires. By setting the validity period in the second authentication information, it is possible to prevent one user terminal from exclusively owning the authentication information for a long time.

In the aspect, the control unit may be configured to set a validity period of the temporary authentication information at the same time as issuing the temporary authentication information, and the control unit may be configured to determine whether a time remaining until the validity period of the temporary authentication information expires is less than a predetermined time length when the distance between the user terminal to which the temporary authentication information has been issued and the vehicle or the facility becomes less than the first distance, and not to issue the second authentication information to the user terminal when the remaining time is less than the predetermined time length. Accordingly, it is possible to prevent one user terminal from exclusively using the authentication information over the validity period of the temporary authentication information and to prevent acquisition of the authentication information by another user terminal from being hindered.

The authentication information control system according to the first aspect of the disclosure may be constituted by one or more processors such as a computer. When the authentication information control system is constituted by a plurality of processors, elements of the authentication information control system are distributed to the plurality of processors and the processors realize the function of the authentication information control system in cooperation with each other.

According to a second aspect of the disclosure, there is provided an authentication information control method of controlling a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the authentication information control method including: issuing temporary authentication information for disabling the locking/unlocking process using the locking/unlocking control device to a user terminal satisfying a first condition; determining whether first authentication information has been issued to another user terminal when a distance between the user terminal to which the temporary authentication information has been issued and the vehicle or the facility becomes less than a first distance; and issuing second authentication information to the user terminal to which the temporary authentication information has been issued when the first authentication information has not been issued to another user terminal, and issuing the second authentication information to the user terminal to which the temporary authentication information has been issued with detection of ending of use of the first authentication information in another user terminal as a trigger when the first authentication information has been issued to the other user terminal. The technical concept disclosed for the authentication information control system in the above-mentioned description can also be applied to the authentication information control method unless a technical discrepancy is caused.

According to a third aspect of the disclosure, there is provided a non-transitory computer readable medium storing a program for controlling a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the program causing a computer to perform a method, the method including: issuing temporary authentication information for disabling the locking/unlocking process using the locking/unlocking control device to a user terminal satisfying a first condition; determining whether first authentication information has been issued to another user terminal when a distance between the user terminal to which the temporary authentication information has been issued and the vehicle or the facility becomes less than a first distance; and issuing second authentication information to the user terminal to which the temporary authentication information has been issued when the first authentication information has not been issued to another user terminal, and issuing the second authentication information to the user terminal to which the temporary authentication information has been issued with detection of ending of use of the first authentication information in another user terminal as a trigger when the first authentication information has been issued to the other user terminal.

According to the above-mentioned aspects, it is possible to improve the degree of freedom in time of a user's access to a predetermined area in a vehicle configured to be lockable and unlockable in a system that controls the user's access to the predetermined area by issuance of authentication information for enabling locking and unlocking thereof.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram schematically illustrating a configuration of a trunk-sharing system including an authentication information control system according to a first embodiment of the disclosure;

FIG. 2 is a diagram illustrating details of configurations of an onboard device, a user terminal, a central server, and a pickup and delivery management server which constitute the trunk-sharing system illustrated in FIG. 1;

FIG. 3 is a diagram illustrating a data structure of pickup and delivery information which is stored in the pickup and delivery management server;

FIG. 4 is a diagram illustrating a data structure of vehicle management information which is stored in the pickup and delivery management server;

FIG. 5 is a diagram illustrating a data structure of issuance status information which is stored in the central server;

FIG. 10B is a diagram illustrating an example of a process sequence in a specific example of authentication information issuance control which is performed by the central server;

FIG. 12 is a flowchart illustrating a formal issuance control process which is performed by a central server according to a modified example of the disclosure.

DETAILED DESCRIPTION OF EMBODIMENTS

Figure 6:
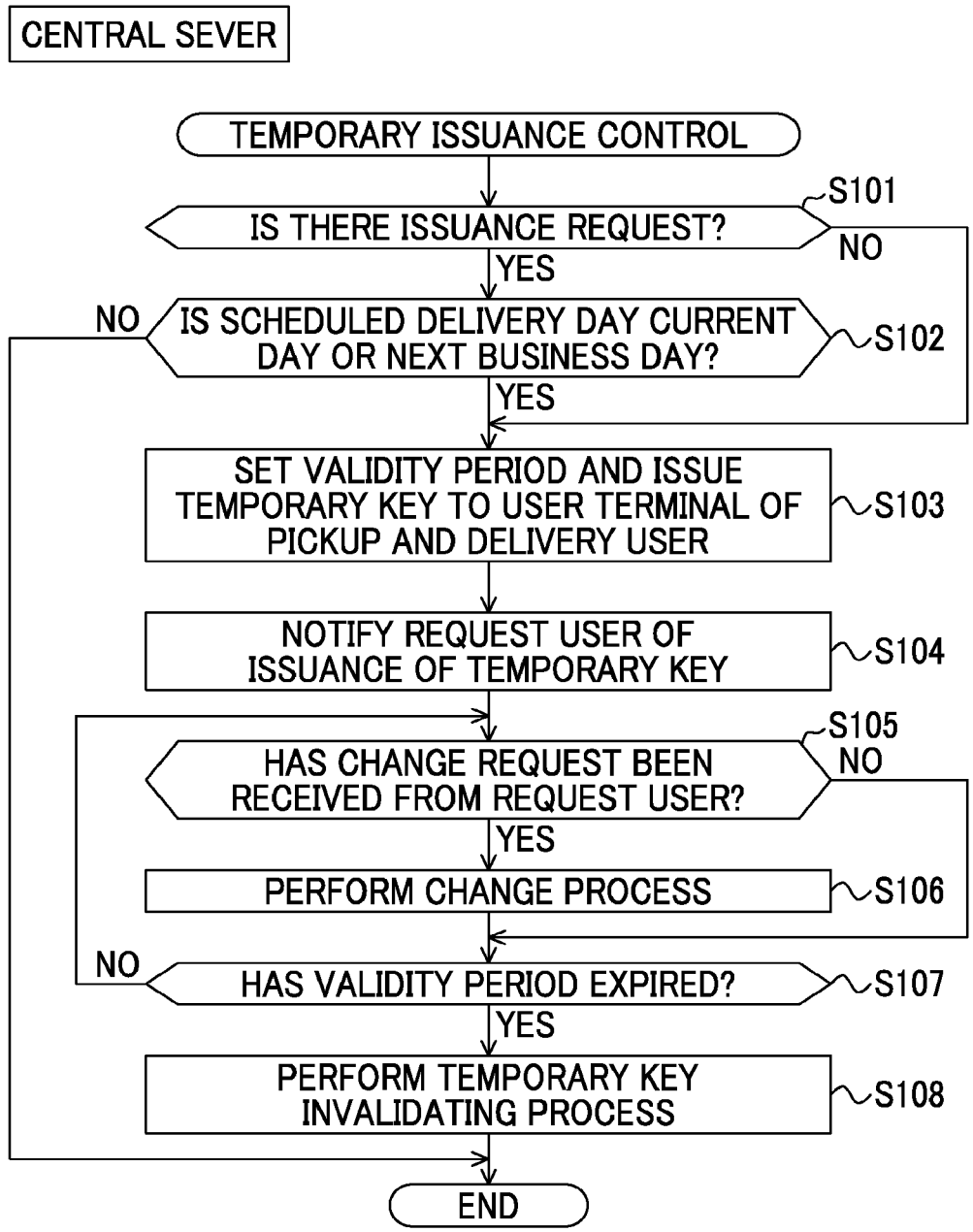
FIG. 6 is a flowchart illustrating a temporary issuance control process which is performed by the central server according to the first embodiment of the disclosure.

Hereinafter, a specific embodiment of the disclosure will be described with reference to the accompanying drawings. Configurations described in the following embodiment are not intended to limit a technical scope of the present disclosure to the configurations unless described particularly.

First Embodiment

System Configuration

FIG. 1 is a diagram schematically illustrating a configuration of a trunk-sharing system 1 according to a first embodiment. The trunk-sharing system 1 is a system for realizing a pickup and delivery service using a cargo compartment as a pickup and delivery place by allowing a person who requests pickup and delivery work of a delivery object (baggage) and a person who performs the pickup and delivery work of the requested delivery object to commonly use (share) the cargo compartment of a vehicle 10 which is designated by a requester. Accordingly, a "person who requests pickup and delivery work of a delivery object" and a "person who performs pickup and delivery work of a delivery object" are users who use a cargo compartment of a vehicle, and the former is referred to as a "request user" and the latter is referred to as a "pickup and delivery user" to distinguish both persons from each other. The cargo compartment is a predetermined area in a vehicle 10 which can accommodate baggage to be picked up and delivered and which is configured to be locked and unlocked by an onboard device 10A as will be described later. The cargo compartment may be, for example, an area which is partitioned from a passenger compartment in which a driver or the like of the vehicle 10 sits such that the cargo compartment and the passenger compartment cannot be accessed from each other. The cargo compartment of the vehicle 10 is defined as a trunk in the first embodiment. An area which can be used as a pickup and delivery place of baggage is not limited to the trunk, and may be, for example, a passenger seat or a rear seat in the passenger compartment. The cargo compartment of the vehicle 10 is an example of a predetermined area in the claims.

In the example illustrated in FIG. 1, the trunk-sharing system 1 includes an onboard device 10A that is installed in a vehicle 10, a user terminal 200 of a pickup and delivery user, a user terminal 50 of a request user, a central server 400, and pickup and delivery management servers 500A and 500B. The onboard device 10A, the user terminal 200, the user terminal 50, the central server 400, and the pickup and delivery management servers 500A and 500B are connected to each other via a network N1. The network N1 may be, for example, a global public communication network such as the Internet, and a wide area network (WAN) or other communication networks may be employed. The network N1 may include a telephone communication network of mobile phones and the like and a radio communication network such as WiFi. The onboard device 10A is connected to the user terminal 200 of a pickup and delivery user via a network N2 including a short-range radio communication network or the like. For example, the trunk-sharing system 1 includes two pickup and delivery management servers 500A and 500B, but may include three or more pickup and delivery management servers. When the pickup and delivery management servers are collectively mentioned in the following description, 500 is used as a reference sign thereof.

The pickup and delivery management server 500 receives registration of an article to be picked up and delivered (hereinafter also referred to as a "pickup and delivery baggage") from a user terminal 50 of a request user. For example, when an article purchased from a product purchase site opened by an electronic transaction provider is delivered as pickup and delivery baggage by the pickup and delivery user, the request user can register pickup and delivery information on the pickup and delivery baggage in the pickup and delivery management server 500 through an application for using a service using the trunk-sharing system 1 (hereinafter also referred to as a predetermined application) which is installed in the user terminal 50 of the request user. The pickup and delivery information includes identification information of the request user and schedule information of pickup and delivery as illustrated in FIG. 3 which will be described later. In the pickup and delivery management server 500, the identification information of the request user is correlated in advance with a vehicle 10 correlated with the request user, and the pickup and delivery information can also include information of a selected pickup and delivery place when the pickup and delivery place to be used is selected from candidates of pickup and delivery places including the vehicle 10 associated with a user (the request user) by the request user. In the following description, it is assumed that the pickup and delivery place of the request user is set to a vehicle 10. The pickup and delivery information further includes information on a status of pickup and delivery baggage. An example of the status information is information on whether pickup and delivery of pickup and delivery baggage has been completed or the like.

It is assumed that the pickup and delivery management server 500A and the pickup and delivery management server 500B illustrated in FIG. 1 are managed by different delivery companies. Accordingly, pickup and delivery of pickup and delivery baggage based on the pickup and delivery information which is managed by the pickup and delivery management server 500A is performed by a delivery company other than the delivery company that performs pickup and delivery of pickup and delivery baggage based on the pickup and delivery information managed by the pickup and delivery management server 500B. When pickup and delivery users belonging to the delivery companies that manage the pickup and delivery management servers 500A and 500B are distinguished from each other, it is assumed in the following description that a suffix is added thereto like a pickup and delivery user A and a pickup and delivery user B. Similarly, when user terminals 200 carried by the pickup and delivery users are distinguished, it is assumed in the following description that a suffix is added thereto like a user terminal 200A and a user terminal 200B.

When a request for pickup and delivery of baggage is received from a user terminal 50 of a request user and a pickup and delivery place thereof is a vehicle 10, the pickup and delivery management server 500 requests the central server 400 to issue authentication information for locking/unlocking a cargo compartment of the vehicle 10 in which the pickup and delivery baggage is accommodated to a user terminal 200 of a pickup and delivery user. In this embodiment, the request is transmitted with a request from the user terminal 200 of the pickup and delivery user as a trigger. The central server 400 transmits authentication information for the vehicle 10 correlated with the identification information of the request user to the user terminal 200 of the pickup and delivery user via the pickup and delivery management server 500 based on the identification information of the request user included in the pickup and delivery information. The pickup and delivery user can access the cargo compartment of the vehicle 10 to deliver and pick up the pickup and delivery baggage by locking/unlocking the cargo compartment of the vehicle 10 using the authentication information acquired by the user terminal 200. Here, the authentication information is digital information which is used to allow an onboard device 10A to perform a locking/unlocking process for the cargo compartment of the vehicle 10 by being transmitted from the user terminal 200 to the onboard device 10A by short-range radio communication and being subjected to an authentication process by the onboard device 10A. The locking/unlocking process for the cargo compartment of the vehicle 10 is a process of locking/unlocking a door of the cargo compartment of the vehicle 10 in which pickup and delivery baggage is accommodated through the onboard device 10A of which details will be described later.

FIG. 2 is a block diagram schematically illustrating configurations of an onboard device 10A, a user terminal 200 of a pickup and delivery user, a user terminal 50 of a request user, the pickup and delivery management server 500, and the central server 400 which constitute the trunk-sharing system 1. The hardware configurations and the functional configurations of the onboard device 10A, the user terminal 200 of a pickup and delivery user, the user terminal 50 of a request user, the pickup and delivery management server 500, and the central server 400 will be described below with reference to FIG. 2.

The onboard device 10A is an example of a locking/unlocking control device in the claims and includes a key unit 100 and a locking/unlocking device 300. The key unit 100 includes the same radio interface as an electronic key (hereinafter referred to as a portable unit) of a smart key, and can perform locking and unlocking of a cargo compartment or a passenger compartment of a vehicle 10 (hereinafter may be simply referred to as "locking and unlocking of a vehicle 10" when the cargo compartment and the passenger compartment do not need to be distinguished) without using any physical key by communication with the existing locking/unlocking device 300 of the onboard device 10A. The key unit 100 performs short-range radio communication with the user terminal 200 of a pickup and delivery user and determines whether it serves as an electronic key of the vehicle 10 based on the result of an authentication process for the user terminal 200 of the pickup and delivery user.

The user terminal 200 of a pickup and delivery user receives authentication information for locking and unlocking the cargo compartment, which is issued by the central server 400, via the pickup and delivery management server 500 as described above when accessing the cargo compartment of the vehicle 10 for delivering and picking up pickup and delivery baggage. Then, the user terminal 200 of the pickup and delivery user transmits the authentication information to the key unit 100, and the key unit compares the received authentication information with authentication information stored in advance in the key unit 100. When the authentication process succeeds, the user terminal 200 is authenticated as a terminal that rightly operates the onboard device 10A. When the user terminal 200 is authenticated, the key unit 100 transmits a key ID of the vehicle 10, which is stored in advance in the key unit 100 and correlated with the authentication information, to the locking/unlocking device 300 along with a locking/unlocking signal. The locking/unlocking device 300 locks or unlocks the vehicle 10 when the key ID received from the key unit 100 coincides with a key ID stored in advance in the locking/unlocking device 300. The key unit 100 and the locking/unlocking device 300 operate with electric power supplied from a battery mounted in the vehicle 10. The key ID stored in advance in the key unit 100 may be encrypted with the authentication information. In this case, the key unit 100 can decrypt the key ID with the authentication information and transmit the key ID to the locking/unlocking device 300 when the authentication process for the user terminal 200 of the pickup and delivery user succeeds.

Details of the locking/unlocking device 300 will be described below. The locking/unlocking device 300 is a device that locks and unlocks a door of a passenger compartment or a cargo compartment of a vehicle 10. For example, the locking/unlocking device 300 may lock and unlock the door of the vehicle 10 in accordance with a locking signal and an unlocking signal which are transmitted from a portable unit corresponding to the vehicle 10 using radio waves of a radio frequency (hereinafter referred to as RF) band. The locking/unlocking device 300 also has a function of transmitting radio waves of a low frequency (hereinafter referred to as LF) band for detecting the portable unit.

In this embodiment, the key unit 100 instead of the portable unit controls locking and unlocking of the door of the vehicle 10 by transmitting and receiving radio waves of an RF band and an LF band to and from the locking/unlocking device 300. In the following description, unless otherwise mentioned, the communication destination of the locking/unlocking device 300 is limited to the key unit 100.

The locking/unlocking device 300 includes an LF transmitter 301, an RF receiver 302, a comparison ECU 303, a body ECU 304, and a door lock actuator 305. The LF transmitter 301 is means that transmits radio waves of an LF band (for example, 100 KHz to 300 KHz) for detecting (polling) the key unit 100. The LF transmitter 301 is incorporated, for example, into a center console or in the vicinity of a steering wheel in the passenger compartment. The RF receiver 302 is means that receives radio waves of an RF band (for example, 100 MHz to 1 GHz) transmitted from the key unit 100. The RF receiver 302 is incorporated at any location in the passenger compartment.

The comparison ECU 303 is a computer that performs control for locking and unlocking the door of the passenger compartment or the cargo compartment of the vehicle 10 based on a signal (a locking signal or an unlocking signal) transmitted from the key unit 100 using radio waves of an RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 is transmitted from a rightful device. Specifically, the comparison ECU 303 determines whether the key ID included in the locking/unlocking signal coincides with the key ID stored in advance in a storage unit (not illustrated) of the comparison ECU 303. Then, the comparison ECU 303 transmits an unlocking command or a locking command to the body ECU 304 based on the determination result. The unlocking command or the locking command is transmitted via an onboard network such as a controller area network (CAN).

The door lock actuator 305 is an actuator that locks and unlocks the door of the vehicle 10 (such as a passenger compartment door which is opened and closed at the time of getting into and out of the passenger compartment as an interior space or a cargo compartment door which is opened and closed at the time of loading baggage in the cargo compartment). The door lock actuator 305 operates based on a signal transmitted from the body ECU 304. The door lock actuator 305 may be configured to independently lock and unlock the passenger compartment door and the cargo compartment door of the vehicle 10.

The body ECU 304 is a computer that executes body control of the vehicle 10. The body ECU 304 has a function of simultaneously or independently performing unlocking and locking of the passenger compartment door or the cargo compartment door of the vehicle 10 by controlling the door lock actuator 305 based on the unlocking command or the locking command received from the comparison ECU 303. The comparison ECU 303 and the body ECU 304 may be embodied as a single body.

The key unit 100 will be described now. The key unit 100 is a device that is disposed at a predetermined position (for example, inside a glove box) in the passenger compartment of the vehicle 10. The key unit 100 has a function of authenticating a user terminal 200 by performing short-range radio communication with the user terminal 200 of a pickup and delivery user or the like and a function of transmitting the locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the locking/unlocking device 300 using radio waves of an RF band.

The short-range communication unit 103 is means that communicates with a user terminal 200 of a pickup and delivery user. The short-range communication unit 103 performs communication in a short range (at a distance at which communication can be performed between the interior and the exterior of the vehicle) using a predetermined radio communication standard. In this embodiment, the short-range communication unit 103 performs data communication based on a Bluetooth (registered trademark) Low Energy standard (hereinafter referred to as BLE). BLE is a low-energy communication standard using Bluetooth, and is characterized in that communication can be started immediately when a communication partner is detected without requiring pairing between devices. When the short-range communication unit 103 performs data communication based on BLE, a communicable range is a range of about several m to 10 in from the short-range communication unit 103 (the key unit 100). In this embodiment, BLE is exemplified, but another radio communication standard can also be used. For example, near field communication (NFC), ultra wideband (UWB), or WiFi (registered trademark) may be used.

The control unit 104 is a computer that performs short-range radio communication with a user terminal 200 of a pickup and delivery user via the short-range communication unit 103 and performs control for authenticating the user terminal 200 and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU which is not illustrated to execute the control program stored in the storage unit 1041. For example, the control unit 104 realizes a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the user terminal 200 of a pickup and delivery user which is performed by the short-range communication unit 103, and a function of generating a locking/unlocking signal when authentication of the user terminal 200 of a pickup and delivery user by the authentication unit 1042 has succeeded.

The authentication unit 1042 authenticates the user terminal 200 based on authentication information included in a locking request or an unlocking request (hereinafter collectively referred to as a locking/unlocking request) transmitted from the user terminal 200 of a pickup and delivery user. Specifically, the authentication unit 1042 compares the authentication information transmitted from the user terminal 200 of a pickup and delivery user with the authentication information stored in the storage unit 1041 and determines that the authentication has succeeded when they satisfy a predetermined relationship. When both pieces of authentication information do not satisfy the predetermined relationship, the authentication unit 1042 determines that the authentication has failed. Here, the predetermined relationship includes a case in which the authentication information stored in the storage unit 1041 coincides with the authentication information transmitted from the user terminal 200 of a pickup and delivery user, a case in which results of predetermined processes such as encryption and decryption using the two pieces of authentication information coincide with each other, and a case in which a result of decryption on one of the two pieces of authentication information coincides with that on the other thereof.

When the authentication of the user terminal 200 of a pickup and delivery user by the authentication unit 1042 has succeeded, a locking/unlocking signal generated in response to a request received from the user terminal 200 is transmitted to the locking/unlocking device 300 via the RF transmitter 102. In the following description, the authentication information stored in the key unit 100 is referred to as device authentication information and the authentication information transmitted from the user terminal 200 of a pickup and delivery user is referred to as terminal authentication information, if necessary.

The key unit 100 transmits the key ID along with the locking/unlocking signal to the locking/unlocking device 300. The key ID may be stored in the key unit 100 in a plaintext state in advance or may be stored in a state in which it is encrypted using a cipher specific to the user terminal 200 of a pickup and delivery user. When the key ID is stored in the encrypted state, the encrypted key ID may be decrypted using the authentication information transmitted from the user terminal 200 of a pickup and delivery user to acquire the original key ID.

In this way, the onboard device 10A performs a sequence of processes of performing the authentication process using the key unit 100, operating the locking/unlocking device 300, and locking or unlocking the passenger compartment or the cargo compartment of the vehicle 10 with the authentication information transmitted from the user terminal 200 as a trigger. This sequence of processes is a locking/unlocking process by the onboard device 10A and is an example of a locking/unlocking process by a locking/unlocking control device in the claims.

The user terminal 200 of a pickup and delivery user will be described now. The user terminal 200 is a small portable computer such as a smartphone, a mobile phone, a tablet terminal, a personal information terminal, or a wearable computer (such as a smart watch). The user terminal 200 may be a personal computer (PC) that is connected to the pickup and delivery management server 500 via the network N1 such as the Internet which is a public communication network. The user terminal 200 of a pickup and delivery user includes a short-range communication unit 201, a communication unit 202, a control unit 203, and an input and output unit 204.

The short-range communication unit 201 is means that performs radio communication with the key unit 100 using the same radio communication standard as that of the short-range communication unit 103 of the key unit 100. A network which is set up between the short-range communication unit 201 and the key unit 100 is illustrated as N2 in FIG. 1. The communication unit 202 is communication means that connects the user terminal 200 to the network N1. In this embodiment, the user terminal 200 can communicate with another device (for example, the pickup and delivery management server 500) via the network N1 using a mobile communication service such as 3G ($3^{rd}$ Generation) or LTE (Long Term Evolution).

The control unit 203 is a computer that takes charge of control of the user terminal 200. The control unit 203 performs, for example, a process of acquiring the terminal authentication information, a process of generating a locking/unlocking request including the acquired terminal authentication information, a process of transmitting the generated locking/unlocking request to the key unit 100, and the like. The control unit 203 is constituted, for example, by a microcomputer, and the functions of performing the above-mentioned processes are realized by causing a CPU (not illustrated) to execute a program stored in storage means (such as a ROM) (not illustrated).

In the control unit 203, an authentication information managing unit 2031 and a locking/unlocking control unit 2032 are embodied as functional units by causing the CPU to execute a program. The locking/unlocking control unit 2032 performs an interaction with a pickup and delivery user via the input and output unit 204. The input and output unit 204 is means that receives an input operation which has been performed by the pickup and delivery user and presents information to the pickup and delivery user. Specifically, the input and output unit 204 includes a touch panel and control means thereof and a liquid crystal display and control means thereof. The touch panel and the liquid crystal display are constituted as a single touch panel display in this embodiment.

The locking/unlocking control unit 2032 displays an operation screen on the input and output unit 204 and generates a locking request or an unlocking request based on an operation which has been performed by the pickup and delivery user. For example, the locking/unlocking control unit 2032 outputs an icon for unlocking, an icon for locking, and the like to the touch panel display and generates an unlocking request or a locking request based on the operation which has been performed by the pickup and delivery user. The operation which is performed by the pickup and delivery user is not limited to an operation using the touch panel display. For example, the operation may be performed using a hardware switch.

In this embodiment, the central server 400 issues temporary key information and formal key information to the user terminal 200. The authentication information managing unit 2031 manages the temporary key information and the formal key information issued by the central server 400. The temporary key information is transmitted from the central server 400 to the user terminal 200 via the pickup and delivery management server 500, for example, before a business start time of a scheduled pickup and delivery date on which a pickup and delivery user carrying the user terminal 200 performs pickup and delivery of baggage in the vehicle 10. The temporary key information is, for example, an access authority to the vehicle 10, and the temporary key information has to be owned for acquiring the formal key information. The temporary key information is not authentication information for locking or unlocking the cargo compartment of the vehicle 10 and the cargo compartment of the vehicle 10 cannot be locked nor unlocked using the temporary key information. The temporary key information is an example of temporary authentication information in the claims.

The temporary key information includes, for example, information (for example, a flag) indicating that it is temporary key information. Along with the temporary key information, for example, identification information of a request user, identification information of baggage, a validity period of the temporary key information, and information which is used for short-range communication with the key unit 100 of the vehicle 10 are transmitted to the user terminal 200. The information which is used for short-range communication with the key unit 100 of the vehicle 10 may be included in the temporary key information. Separately from the temporary key information, pickup and delivery information on baggage to be picked up or delivered illustrated in FIG. 3 which will be described later and vehicle management information of the vehicle 10 which is a pickup and delivery place illustrated in FIG. 4 which will be described later are transmitted from the pickup and delivery management server 500 to the user terminal 200. For example, at the time at which the temporary key information transmitted from the central server 400 is received by the user terminal 200, the authentication information managing unit 2031 stores the received temporary key information in storage means (not illustrated) of the user terminal 200. Thereafter, for example, at the time at which a temporary key information invalidation instruction transmitted from the central server 400 by execution of a temporary key information invalidating process is received, the authentication information managing unit 2031 deletes the temporary key information from the storage means.

The authentication information managing unit 2031 performs a process of acquiring formal key information from the central server 400. The formal key information is terminal authentication information which is used for the key unit 100 to authenticate the user terminal 200. The formal key information (the terminal authentication information) is different from information (a key ID) which is used for the locking/unlocking device 300 to authenticate the key unit 100. The terminal authentication information which is used for the key unit 100 to authenticate the user terminal 200 is, for example, authentication information corresponding to authentication information specific to the key unit 100 mounted in the vehicle 10. The formal key information is an example of predetermined authentication information in the claims.

In this embodiment, when setup of connection with the key unit 100 via the network N2 using the short-range communication unit 201 is detected, the authentication information managing unit 2031 transmits a formal key information issuance request to the central server 400 via the pickup and delivery management server 500 using the communication unit 202. The setup of connection to the key unit 100 via the network N2 using the short-range communication unit 201 means, for example, that a radio signal such as a beacon signal emitted from the short-range communication unit 103 of the key unit 100 is received with a receiving intensity of radio waves equal to or greater than a predetermined threshold value.

The formal key information issuance request includes the identification information of the user terminal 200 and a signal for requesting issuance of terminal authentication information specific to the key unit 100. The central server 400 having received the formal key information issuance request transmits formal key information including terminal authentication information specific to the key unit 100 mounted in the vehicle 10 to the user terminal 200. Accordingly, the user terminal 200 can perform an operation of unlocking the vehicle 10. When the user terminal 200 does not store the terminal authentication information, a locking operation and an unlocking operation on the operation screen on the vehicle 10 is not possible.

In this embodiment, the formal key information acquired by the user terminal 200 may be a one-time key. For example, at the time at which the formal key information transmitted from the central server 400 is received by the user terminal 200, the authentication information managing unit 2031 stores the formal key information in the storage means (not illustrated) of the user terminal 200. Thereafter, for example, at the time at which an invalidation instruction is received through execution of a formal key information invalidating process by the central server 400, the authentication information managing unit 2031 deletes the formal key information from the storage means.

The times at which the temporary key information and the formal key information stored in the storage means of the user terminal 200 are deleted are not limited to the above-mentioned examples. For example, at the time at which a predetermined time has elapsed from a time point at which the user terminal 200 has received the temporary key information and the formal key information transmitted from the central server 400 or a time point at which the central server 400 has transmitted the temporary key information and the formal key information to the user terminal 200, the temporary key information and the formal key information stored in the storage means of the user terminal 200 may be deleted. The terminal authentication information included in the formal key information is not limited to the above-mentioned one-time key, and may be a limited key which is valid in only a predetermined time period. It is assumed that device authentication information corresponding to the terminal authentication information is stored in advance in the key unit 100 regardless of whether the terminal authentication information is a one-time key or a limited key.

The user terminal 50 of a request user will be described below. Similarly to the user terminal 200, the user terminal 50 may be, for example, a small computer such as a smartphone, a mobile phone, a tablet terminal, a personal information terminal, or a wearable computer (such as a smart watch) or may be a personal computer (PC). The user terminal 50 of a request user includes a communication unit 51, a control unit 52, and an input and output unit 53.

The communication unit 51 is communication means for connection to the network N1, which is functionally the same as the communication unit 202. The control unit 52 is a computer that takes charge of control of the user terminal 50. The control unit 52 is constituted, for example, by a microcomputer, and functions of performing various processes are realized by causing a CPU (not illustrated) to execute a program stored in storage means (such as a ROM) (not illustrated). For example, the control unit 52 executes a predetermined application, and requests the pickup and delivery management server 500 of a predetermined delivery company to pick up and deliver pickup and delivery baggage via the input and output unit 53. The input and output unit 53 is means that receives an input operation which has been performed by a request user and provides information to the request user, which is functionally the same as the input and output unit 204.

In FIG. 2, the user terminal 50 does not explicitly have an element corresponding to the short-range communication unit 201, but may include such an element, and the user terminal 50 may be configured to operate the locking/unlocking device 300 by causing the control unit 52 to perform a process of acquiring terminal authentication information from the central server 400 and transmitting the acquired terminal authentication information to the key unit 100 by short-range radio communication.

The pickup and delivery management server 500 will be described now. The pickup and delivery management server 500 has a general configuration of a computer and, at least one pickup and delivery management server is provided as a management server of each delivery company when a plurality of delivery companies participates in the trunk-sharing system 1. The pickup and delivery management server 500 is, for example, a computer including a processor (not illustrated) such as a central processing unit (CPU) or a digital signal processor (DSP), a main storage unit (not illustrated) such as a random access memory (RAM) and a read only memory (ROM), and an auxiliary storage unit (not illustrated) such as an erasable programmable ROM (EPROM), a hard disk drive (HDD), and a removable medium. The removable medium is, for example, a universal serial bus (USB) memory or a disk recording medium such as a compact disc (CD) or a digital versatile disc (DVD). An operating system (OS), various programs, various tables, and the like are stored in the auxiliary storage unit, and functions matching a predetermined purpose can be realized by loading a program stored therein into a work area of the main storage unit, executing the loaded program, and controlling the constituent units through execution of the program.

The pickup and delivery management server 500 includes a communication unit 501. The communication unit 501 is connected to another device and performs communication between the pickup and delivery management server 500 and the other device (for example, the central server 400 or the user terminal 200). The communication unit 501 is, for example, a local area network (LAN) interface board and a radio communication circuit for radio communication. The LAN interface board or the radio communication circuit is connected to the network N1 such as the Internet which is a public communication network.

The pickup and delivery management server 500 includes a pickup and delivery management database (DB) 503 that stores the above-mentioned pickup and delivery information. The pickup and delivery management DB 503 is configured to store the pickup and delivery information in the auxiliary storage unit in which correlation between the request user and the pickup and delivery information is performed. The pickup and delivery management DB 503 is constructed by causing a program of a database management system (DBMS) which is executed by the processor to manage data stored in the auxiliary storage unit. The pickup and delivery management DB 503 is, for example, a relational database.

A structure of pickup and delivery information stored in the pickup and delivery management DB 503 will be described below with reference to FIG. 3. FIG. 3 illustrates a table structure of pickup and delivery information, and a pickup and delivery information table includes fields of request user ID, baggage ID, distinction between pickup and delivery, pickup and delivery date and time, pickup and delivery place, pickup and delivery status, baggage properties, and pickup and delivery user terminal ID. Identification information for identifying a request user is input to the field of request user ID. Identification information for identifying baggage to be picked up and delivered is input to the field of baggage ID. Information for specifying whether pickup and delivery baggage is delivered or picked up by a pickup and delivery user is input to the field of distinction between pickup and delivery. Information indicating a scheduled pickup and delivery date and time of baggage is input to the field of pickup and delivery date and time. For example, when there is a pickup and delivery date and time designated by the request user, information indicating the desired pickup and delivery date and time designated by the request user is input to the field of pickup and delivery date and time. A pickup and delivery place designated by the request user from home and a vehicle of the request user is input to the field of pickup and delivery place. Information indicating whether pickup and delivery of pickup and delivery baggage has been completed by a pickup and delivery user is input to the field of pickup and delivery status. For example, "completed" is input when the pickup and delivery of pickup and delivery baggage has been completed, and "not completed" is input thereto when the pickup and delivery has not been completed. Attributes information such as a weight and a size of pickup and delivery baggage is input to the field of baggage attributes. Identification information of the user terminal of the pickup and delivery user is input to the field of pickup and delivery user terminal ID.

In the pickup and delivery management server 500, a control unit 502 is embodied as a functional unit by execution of a program by the processor. The control unit 502 performs management and control of registration and update of pickup and delivery information in the pickup and delivery management DB 503. For example, when a request user requests pickup and delivery of pickup and delivery baggage using the user terminal 50 thereof, the control unit 502 correlates the identification information of baggage, the pickup and delivery date and time, and the pickup and delivery place, and the like with the identification information of the request user, generates pickup and delivery information corresponding to the request user, and stores the generated pickup and delivery information in the pickup and delivery management DB 503. The control unit 502 transmits a temporary key information issuance request for the user terminal 200 of a pickup and delivery user who is scheduled to deliver baggage to be delivered or picked up to the central server 400, for example, at the time at which the baggage to be delivered in the pickup and delivery information stored in the pickup and delivery management DB 503 arrives at a delivery center or at the time at which a pickup and delivery schedule of baggage to be picked up is determined. The time at which the temporary key information issuance request is issued is not limited to the above-mentioned times, and temporary key information issuance requests for baggage which has arrived at the delivery center or has been requested for pickup in the meantime may be transmitted together, for example, once a day or once every several hours.

When change of information such as a pickup and delivery date and time or a pickup and delivery place has been notified from the request user after the pickup and delivery information has been generated, the control unit 502 updates the pickup and delivery information stored therein to correspond to the change. The control unit 502 may transmit a notification of change of information such as a pickup and delivery date and time or a pickup and delivery place to the central server 400. The control unit 502 communicates with the user terminal 200 of a pickup and delivery user via the communication unit 501 and also updates information on the status of pickup and delivery baggage which is included in the pickup and delivery information. For example, the control unit 502 receives status information (for example, information indicating completion of pickup and delivery) input via the input and output unit 204 of the user terminal 200 by the pickup and delivery user from the user terminal 200 and updates the corresponding pickup and delivery information.

Vehicle management information in which a request user and a vehicle 10 as the corresponding pickup and delivery place are correlated is also stored in the pickup and delivery management DB 503. The structure of the vehicle management information will be described below with reference to FIG. 4. FIG. 4 illustrates a table structure of the vehicle management information, and a vehicle management information table includes a field of request user ID, a field of vehicle model, a field of vehicle color, and a field of vehicle number to which information (a vehicle model, a vehicle color, and a vehicle number) for identifying the vehicle 10 is input such that a pickup and delivery user can detect the vehicle 10 when the vehicle 10 has been selected as the pickup and delivery place by the request user. The vehicle management information table also includes a field of vehicle position to which position information on a position at which the vehicle 10 is located is input. The position information of the vehicle 10 may be acquired by an input via the user terminal 50 from the request user, or position information of the vehicle 10 which is acquired by a data communication device disposed in the vehicle 10 and transmitted to the central server 400 may be acquired from the central server 400.

The control unit 502 transmits a pickup and delivery instruction to the corresponding user terminal 200 such that the pickup and delivery user can pick up and deliver pickup and delivery baggage at the vehicle 10 based on the pickup and delivery information and the vehicle management information correlated with the request user ID. The pickup and delivery instruction may be transmitted to the user terminal 200 a plurality of times, not once. For example, pickup and delivery instructions associated with pickup and delivery on the next day may be transmitted together to the user terminals 200 of pickup and delivery users on the day before a scheduled pickup and delivery day and pickup and delivery instructions may be transmitted again on the current day of pickup and delivery. When the pickup and delivery information has been updated, the updated details are reflected therein at the time of transmission again.

One of the functional elements of the pickup and delivery management server 500 or some of the processes thereof may be embodied by another computer connected to the network N1. A sequence of processes which are performed by the pickup and delivery management server 500 may be implemented in hardware or may be implemented in software.

The central server 400 will be described below. The central server 400 has a general configuration of a computer, and a basic hardware configuration thereof is the same as the pickup and delivery management server 500. Specifically, the central server 400 includes a processor, a main storage unit, and an auxiliary storage unit which are not illustrated. Accordingly, in the central server 400, functions matching a predetermined purpose can be realized by causing the processor to load a program stored in the auxiliary storage unit into a work area of the main storage unit and to execute the loaded program and controlling the constituent units or the like through execution of the program. The central server 400 also includes a communication unit 401. The communication unit 401 of the central server 400 is functionally the same as the communication unit 501 of the pickup and delivery management server 500 and performs communication between the central server 400 and another device (for example, the pickup and delivery management server 500).

The central server 400 includes a user information DB 403, an authentication information DB 404, and an issuance status information DB 405 that store a variety of information in the auxiliary storage unit. Such databases (DB) are constructed by causing a program of a database management system which is executed by the processor to manage data stored in the auxiliary storage unit. The user information DB 403, the authentication information DB 404, and the issuance status information DB 405 are, for example, relational databases.

The user information DB 403 stores identification information of a user who uses the vehicle 10 and a corresponding password. A user who uses the vehicle 10 includes, for example, a pickup and delivery user who delivers pickup and delivery baggage to the vehicle 10 or the like and a request user who recovers the delivered pickup and delivery baggage.

The authentication information DB 404 stores, for example, authentication information for the vehicle 10 which corresponds to the terminal authentication information included in the formal key information and predetermined information which is used for short-range communication with the key unit 100 of the vehicle 10. The authentication information of the vehicle 10 is information which is correlated with the identification information (a key ID) for the vehicle 10. The information which is correlated with the identification information (the key ID) for the vehicle 10 is, for example, identification information specific to the key unit 100 of the onboard device 10A. The authentication information DB 404 may store information on a validity period (which includes a validity time period) of the authentication information, whether the authentication information is invalidated, and the like in addition to the authentication information for the vehicle 10. The predetermined information which is used for short-range communication with the key unit 100 of the vehicle 10 includes, for example, identification information of the key unit 100 which is included in an advertising packet emitted from the key unit 100 in BLE.

The issuance status information DB 405 stores issuance status information indicating issuance statuses of temporary key information and formal key information for a pickup and delivery user who is scheduled to pick up and deliver pickup and delivery baggage of which a pickup and delivery place is designated as the vehicle 10. The structure of issuance status information stored in the issuance status information DB 405 will be described below with reference to FIG. 5. FIG. 5 illustrates a table structure of the issuance status information, and an issuance status information table includes fields of request user ID, baggage ID, pickup and delivery date and time, key issuance status, delivery company ID, and pickup and delivery user terminal ID.

The same values as the fields in the pickup and delivery information table stored in the pickup and delivery management DB 503 are input to the field of request user ID, the field of baggage ID, the field of pickup and delivery date and time, and the field of pickup and delivery user terminal ID. Identification information of a delivery company is input to the field of delivery company ID. Information indicating one of "during temporary issuance," "during waiting for formal issuance," and "during formal issuance" which indicate issuance statuses of the temporary key information and the formal key information is input to the field of key issuance status. The status of "during temporary issuance" is a status indicating that temporary key information has been issued to the user terminal 200 of a pickup and delivery user corresponding to the corresponding baggage. The status of "during waiting for formal issuance" is a status indicating that a formal key information issuance request from the user terminal 200 of a pickup and delivery user corresponding to the corresponding baggage is suspended. The state of "during formal issuance" is a status indicating that formal key information has been issued to the user terminal 200 of a pickup and delivery user corresponding to the corresponding baggage.

The issuance status information in the issuance status information DB 405 is deleted from the issuance status information DB 405, for example, when the validity period of the temporary key information expires or when a scheduled delivery date of a target baggage expires.

In the central server 400, a control unit 402 is embodied as a functional unit by causing the processor to execute a program. The control unit 402 performs control associated with issuance of authentication information to the user terminal 200 or the like. Specifically, the control unit 402 includes a temporary issuance control unit 4021 and a formal issuance control unit 4022 as functional units.

The temporary issuance control unit 4021 controls issuance of temporary key information. Hereinafter, issuance of temporary key information is also referred to as temporary issuance. The temporary issuance control unit 4021 receives a temporary key information issuance request, for example, from the pickup and delivery management server 500. For example, the temporary issuance control unit 4021 receives information on baggage to be picked up and delivered and information on the user terminal 200 of a pickup and delivery user as an issuance destination along with the temporary key information issuance request. For example, identification information of baggage, identification information of a request user, and a designated pickup and delivery date and time are included in the information on baggage to be picked up and delivered.

The temporary issuance control unit 4021 transmits temporary key information to the user terminal 200 via the pickup and delivery management server 500. For example, the temporary key information includes information indicating that it is temporary key information. The temporary issuance control unit 4021 also transmits identification information of baggage, identification information of a request user, and information on a validity period of the temporary key information along with the temporary key information. When predetermined information is used for short-range communication with the key unit 100, the information is transmitted along with the temporary key information or the information is included in the temporary key information.

The validity period of the temporary key information is set to the designated pickup and delivery time period when a pickup and delivery time period has been designated by the request user and to 24 hours from a business start of the scheduled pickup and delivery date when a pickup and delivery time period has not been designated by the request user. The temporary issuance control unit 4021 registers the information on baggage for which the temporary key information has been issued and the information on the user terminal 200 of a pickup and delivery user who is scheduled to pick up and deliver the baggage in the issuance status information table stored in the issuance status information DB 405. The key issuance status is registered as "during temporary issuance."

When the temporary key information is issued, the temporary issuance control unit 4021 transmits a temporary issuance notification to the user terminal 50 of a request user. The temporary issuance notification includes information such as the identification information of the baggage, the scheduled pickup and delivery date and time, the delivery company, and the pickup and delivery place. By transmitting the temporary issuance notification to the user terminal 50 of a request user, the request user can be notified of a delivery schedule and, for example, when a scheduled reception time period has changed, a designated delivery time period or the like can be changed. At the time of issuance of temporary key information, the temporary issuance control unit 4021 may request the user terminal 50 of a request user to permit temporary issuance and issue the temporary key information when the temporary issuance has been permitted.

The formal issuance control unit 4022 controls issuance of formal key information. Issuance of formal key information is also referred to as formal issuance. Specifically, the formal issuance control unit 4022 receives a formal key information issuance request from the user terminal 200 of a pickup and delivery user via the pickup and delivery management server 500. For example, the formal issuance control unit 4022 receives identification information of the user terminal 200 which is an issuance request source and identification information of baggage to be picked up and delivered along with the formal key information issuance request.

The formal issuance control unit 4022 determines whether formal key information has been already issued to another user terminal 200 as for the request user which is a target of the formal key information issuance request. Whether formal key information has been already issued to another user terminal 200 as for the request user which is a target of the formal key information issuance request is acquired, for example, depending on whether there is a record in which the value of the field of request user ID coincides with the identification information of the request user of the issuance status information DB 405 and in which the key issuance status is "during formal issuance."

When formal key information has not been already issued to another user terminal 200 as for the request user which is a target of the formal key information issuance request, the formal issuance control unit 4022 transmits formal key information which is authentication information corresponding to the key unit 100 (terminal authentication information) to the user terminal 200 as a request source via the pickup and delivery management server 500. Along with the formal key information, for example, information of a validity period of the formal key information, identification information of the request user, and identification information of baggage are also transmitted. The validity period of the formal key information is set to a time ranging from 5 minutes to 30 minutes after the formal key information has been issued from the central server 400 or after the user terminal 200 has received the formal key information. In this case, the formal issuance control unit 4022 updates the key issuance status of a record which coincides with the baggage ID of baggage to be picked up and delivered in the issuance status information DB 405 to "during formal issuance."

When formal key information has been already issued to another user terminal 200 as for the request user which is a target of the formal key information issuance request, the formal issuance control unit 4022 causes the formal key information issuance request from the user terminal 200 as the request source to wait (suspends the request). In this case, the formal issuance control unit 4022 updates the key issuance status of the record which coincides with the baggage ID of baggage to be picked up and delivered in the issuance status information DB 405 to "during waiting for formal issuance." The formal issuance control unit 4022 may transmit a waiting notification to the user terminal 200 as the request source.

When ending of use of formal key information by the request user has been detected, the formal issuance control unit 4022 determines whether there is a user terminal 200 during waiting for formal issuance as for the request user after a predetermined time has elapsed from the detection. When there is a user terminal 200 during waiting for formal issuance as for the request user having ended use of formal key information, the formal issuance control unit 4022 transmits formal key information to the user terminal 200 during waiting.

Ending of use of the formal key information by the request user of the user terminal 200 is detected, for example, by expiration of the validity period of the formal key information or reception of a formal key information return notification from the user terminal 200 via the pickup and delivery management server 500. For example, when an operation of completing the pickup and delivery is input by the pickup and delivery user or when a short-range communication radio signal from the key unit 100 cannot be received with a predetermined receiving intensity of radio waves, the user terminal 200 transits the formal key information return notification to the central server 400 via the pickup and delivery management server 500.

When ending of use of the formal key information for the request user has been detected, the formal issuance control unit 4022 performs a formal key information invalidating process on the user terminal 200 of which ending of use of the formal key information has been detected after a predetermined time has elapsed from the detection. The reason why the invalidating process is not performed immediately after ending of use of the formal key information has been detected is that the validity of the locking function of the vehicle 10 is suspended in the user terminal 200. Accordingly, for example, the user terminal 200 can transmit a locking request to the vehicle 10 for a moment even when the validity period of the formal key information has expired, and can lock the vehicle 10 even when the validity period of the formal key information has expired in a state in which the pickup and delivery user forgot locking of the vehicle 10. When the formal key information invalidating process ends, the formal issuance control unit 4022 update the key issuance status of the record coinciding with the baggage ID of baggage to be picked up and delivered in the issuance status information DB 405 to "during temporary key issuance."

Details of the processes of invalidating temporary key information and formal key information which are performed by the temporary issuance control unit 4021 and the formal issuance control unit 4022 are not particularly limited as long as the pickup and delivery user cannot lock and unlock the vehicle 10 using the already issued authentication information. Examples of the processes of invaliding temporary key information and the formal key information are as follows. (1) The central server 400 instructs the user terminal 200 to delete temporary key information or the formal key information. (2) The central server 400 instructs the user terminal 200 to set an invalidation flag of temporary key information or formal key information. In this case, the control unit 203 of the user terminal 200 needs to be configured such that authentication information included in the formal key information of which the invalidation flag is set is not transmitted to the vehicle 10 by short-range radio communication. (3) The central server 400 instructs the user terminal 200 to rewrite the validity period included in the temporary key information or the formal key information to a past date and time. (4) The central server 400 instructs the user terminal 200 not to transmit the temporary key information or the formal key information, which is invalid, to the vehicle 10.

One of the functional elements of the central server 400 or some of the processes thereof may be embodied by another computer connected to the network N1. A sequence of processes which are performed by the central server 400 may be implemented in hardware or may be implemented in software.

Process Flow

FIG. 6 is a flowchart illustrating a temporary issuance control process which is performed by the central server 400. The temporary issuance control process is a process associated with temporary key information issuance control which is performed by the central server 400. The process flow illustrated in FIG. 6 is performed, for example, at predetermined time intervals. The execution entity of the process flow illustrated in FIG. 6 is the processor mounted in the central server 400, but it is assumed that the temporary issuance control unit 4021 which is a functional unit is used as an entity for the purpose of convenience. The process flow illustrated in FIG. 6 is a process flow which is performed on a single piece of baggage to be picked up and delivered.

In S101, the temporary issuance control unit 4021 determines whether a temporary key information issuance request has been received from the pickup and delivery management server 500. Along with the temporary key information issuance request, for example, information on baggage to be picked up and delivered and information of the user terminal 200 of the pickup and delivery user as an issuance destination are also received. The process flow transitions to S102 when the determination result of S101 is positive and the process flow transitions to S103 when the determination result is negative.

In S102, the temporary issuance control unit 4021 determines whether a pickup and delivery day designated by the request user or a pickup and delivery day scheduled by the pickup and delivery management server 500 is the current day or a next business day. Information of the designated pickup and delivery day or the scheduled pickup and delivery day for baggage to be picked up and delivered is included, for example, in pickup and delivery information on target baggage which is transmitted from the pickup and delivery management server 500 along with the temporary key information issuance request. When the determination result of S102 is positive, the process flow transitions to S103. When the determination result of S102 is negative, temporary issuance for the target baggage is suspended and the process flow illustrated in FIG. 6 ends. The temporary issuance control process on the baggage of which temporary issuance has been suspended is performed again, for example, on the next business day.

In S103, the temporary issuance control unit 4021 sets a validity period of the temporary key information and transmits the temporary key information to the user terminal 200. The validity period of the temporary key information is set to a designated pickup and delivery time period when the pickup and delivery time period is designated by the request user and is set to 24 hours from the business start time of the scheduled pickup and delivery day when the pickup and delivery time period is not designated by the request user. Along with the temporary key information, for example, identification information of baggage, identification information of the request user, information of the validity period of the temporary key information, and predetermined information which is used for short-range communication with the key unit 100 are transmitted. The temporary issuance control unit 4021 registers a record in the issuance status information table stored in the issuance status information DB 405 for the baggage to be picked up and delivered of the pickup and delivery user of the user terminal 200 as an issuance destination of the temporary key information. The field of key issuance status in the registered record is "during temporary issuance."

In S104, the temporary issuance control unit 4021 transmits a temporary key information issuance notification to the user terminal 50 of the request user via the pickup and delivery management server 500. In S105, the temporary issuance control unit 4021 determines whether a pickup and delivery change request has been received from the user terminal 50 of the request user via the pickup and delivery management server 500. The process flow transitions to S106 when the determination result of S105 is positive. The process flow transitions to S107 when the determination result of S105 is negative.

In S106, the temporary issuance control unit 4021 performs a process based on details of the pickup and delivery change request. For example, when the designated pickup and delivery time period has changed, the temporary issuance control unit 4021 issues the temporary key information with a designated time period after the change as a validity period and transmits the temporary key information to the user terminal 200 of the corresponding pickup and delivery user. The user terminal 200 having received the temporary key information updates the stored temporary key information to the newly received temporary key information. For example, when the designated pickup and delivery day has changed, the temporary issuance control unit 4021 performs the temporary key information invalidating process on the user terminal 200 of the pickup and delivery user who picks up and delivers the corresponding baggage.

In S107, the temporary issuance control unit 4021 determines whether the validity period of the temporary key information has expired. The process flow transitions to S108 when the determination result of S107 is positive, and the process flow transitions to S105 when the determination result is negative.

In S108, since the validity period of the temporary key information has expired, the temporary issuance control unit 4021 performs the temporary key information invalidating process. The temporary issuance control unit 4021 deletes the record in the issuance status information table stored in the issuance status information DB 405 for the target baggage. Thereafter, the process flow illustrated in FIG. 6 ends.

Figure 7:
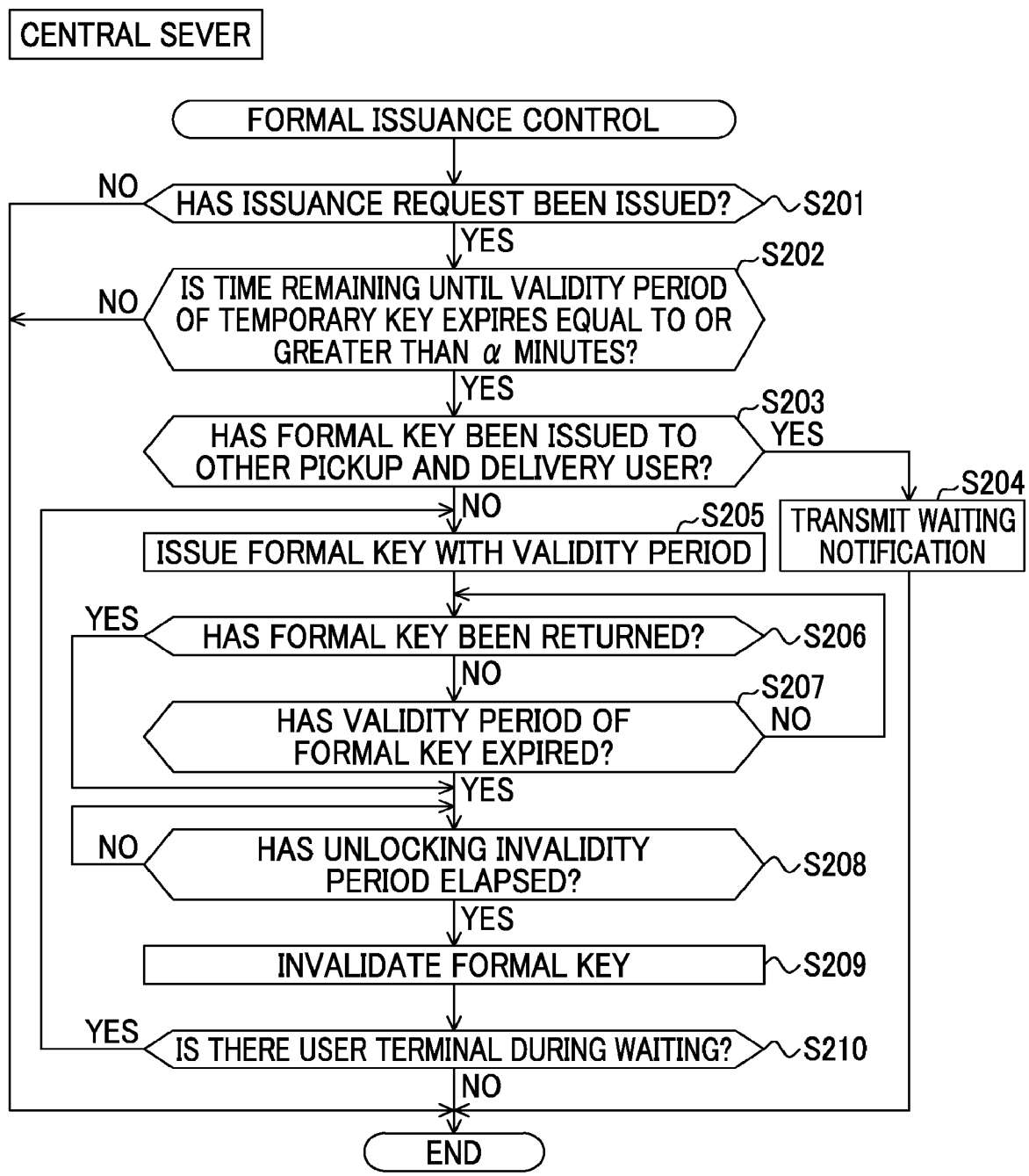
FIG. 7 is a flowchart illustrating a formal issuance control process which is performed by the central server according to the first embodiment of the disclosure.

FIG. 7 is a flowchart illustrating a formal issuance control process which is performed by the central server 400. The formal issuance control process is a process associated with formal key information issuance control. The process flow illustrated in FIG. 7 is performed, for example, at predetermined time intervals. The execution entity of the process flow illustrated in FIG. 7 is the processor mounted in the central server 400, but it is assumed that the formal issuance control unit 4022 which is a functional unit is used as an entity for the purpose of convenience.

In S201, the formal issuance control unit 4022 determines whether a formal key information issuance request has been received from the user terminal 200 via the pickup and delivery management server 500. Along with the formal key information issuance request, for example, identification information of the user terminal 200 as an issuance request source and identification information of baggage to be picked up and delivered are also received. The process flow transitions to S202 when the determination result of S201 is positive and the process flow illustrated in FIG. 7 ends when the determination result is negative.

In S202, the formal issuance control unit 4022 determines whether a time remaining until the validity period of the temporary key information issued to the user terminal 200 as a formal key information issuance request source is equal to or greater than α minutes. For example, the validity period of the temporary key information is the designated time period when there is a time period designated by the request user and is 24 hours from the business start time when there is not designated time period. The process flow transitions to S203 when the determination result of S202 is positive, and the process flow illustrated in FIG. 7 ends when the determination result is negative. That is, formal issuance is not performed in a minutes before the validity period of the temporary key information expires. Here, for example, a minutes is the same length as the time length of the validity period (for example, 5 to 30 minutes) of the formal key information. Accordingly, it is possible to prevent the user terminal 200 from exclusively owning the formal key information for the vehicle 10 over the validity period of the temporary key information.

In S203, the formal issuance control unit 4022 determines whether the formal key information for the vehicle 10 has been issued to another user terminal 200. Whether the formal key information for the vehicle 10 has been already issued is acquired, for example, depending on whether there is a record in which the field of key issuance status is "during formal issuance" among the records in which the value of the field of request user ID coincides with identification information of the request user received along with the formal key information issuance request in the issuance status information DB 405. The process flow transitions to S204 when the determination result of S203 is positive, and the process flow transitions to S205 when the determination result is negative.

In S204, since the formal key information for the vehicle 10 has been issued to another user terminal 200, the formal issuance control unit 4022 transmits a waiting notification to the user terminal 200 as the formal key information issuance request source via the pickup and delivery management server 500. The formal issuance control unit 4022 updates the field of key issuance status in the record corresponding to the target baggage in the issuance status information DB 405 to "during waiting for formal issuance." Thereafter, the process flow illustrated in FIG. 7 ends. For example, when formal key information is not issued to the user terminal 200 even if a predetermined time has elapsed after the field of key issuance status has been updated to "during waiting for formal issuance," the formal issuance control unit 4022 may return the field of key issuance status to "during temporary issuance."

In S205, the formal issuance control unit 4022 transmits the formal key information with a validity period set to the user terminal 200 therein via the pickup and delivery management server 500. The validity period of the formal key information is set, for example, to 5 minutes to 30 minutes from issuance from the formal issuance control unit 4022 or reception by the user terminal 200.

In S206, the formal issuance control unit 4022 determines whether a formal key information return notification has been received from the user terminal 200. The process flow transitions to S208 when the determination result of S206 is positive, and the process flow transitions to S207 when the determination result is negative.

In S207, the formal issuance control unit 4022 determines whether the validity period of the formal key information issued to the user terminal 200 has expired. The process flow transitions to S208 when the determination result of S207 is positive, and the process flow transitions to S206 when the determination result is negative.

In S208, since a formal key information return notification has been received from the user terminal 200 or the validity period of the formal key information issued to the user terminal 200 has expired, that is, ending of use of the formal key information has been detected, the formal issuance control unit 4022 determines whether an unlocking invalidation period which is started after ending of use of the formal key information has been detected has expired. The unlocking invalidation period is a period in which the user terminal 200 can lock the vehicle 10 but cannot unlock the vehicle 10. The unlocking invalidation period ranges, for example, from 5 minutes to 15 minutes. The process flow transitions to S209 when the determination result of S208 is positive, and the process of S208 is repeatedly performed when the determination result is negative.

In S209, the formal issuance control unit 4022 performs a process of invalidating the formal key information issued to the user terminal 200. The formal issuance control unit 4022 updates the field of key issuance status in the record corresponding to the baggage to be picked up and delivered of the user terminal 200 in the issuance status information DB 405 to "during temporary issuance."

In S210, the formal issuance control unit 4022 determines whether there is another user terminal 200 during waiting for formal issuance for the vehicle 10. Whether there is another user terminal 200 during waiting for formal issuance for the vehicle 10 is acquired, for example, depending on whether there is a record in which the field of key issuance status is "during waiting for formal issuance" among the records of which the value of the field of request user ID matches the record corresponding to the baggage to be picked up and delivered of the user terminal 200 on which the formal key information invalidating process has performed in S209 in the issuance status information DB 405.

When the determination result of S210 is positive, the process flow transitions to S204 and the formal key information is issued to another user terminal 200 during waiting for issuance of the formal key information. When there is a plurality of user terminals 200 during waiting for issuance of the formal key information, for example, the formal key information may be issued to a user terminal 200 having a longest waiting time or the formal key information may be issued to a user terminal having a smallest time remaining until the validity period of the temporary key information expires. When there is a plurality of user terminals 200 during waiting for issuance of the formal key information, the method of selecting a user terminal 200 to which the formal key information is issued is not limited thereto. When the determination result of S210 is negative, the process flow illustrated in FIG. 7 ends.

Figure 8:
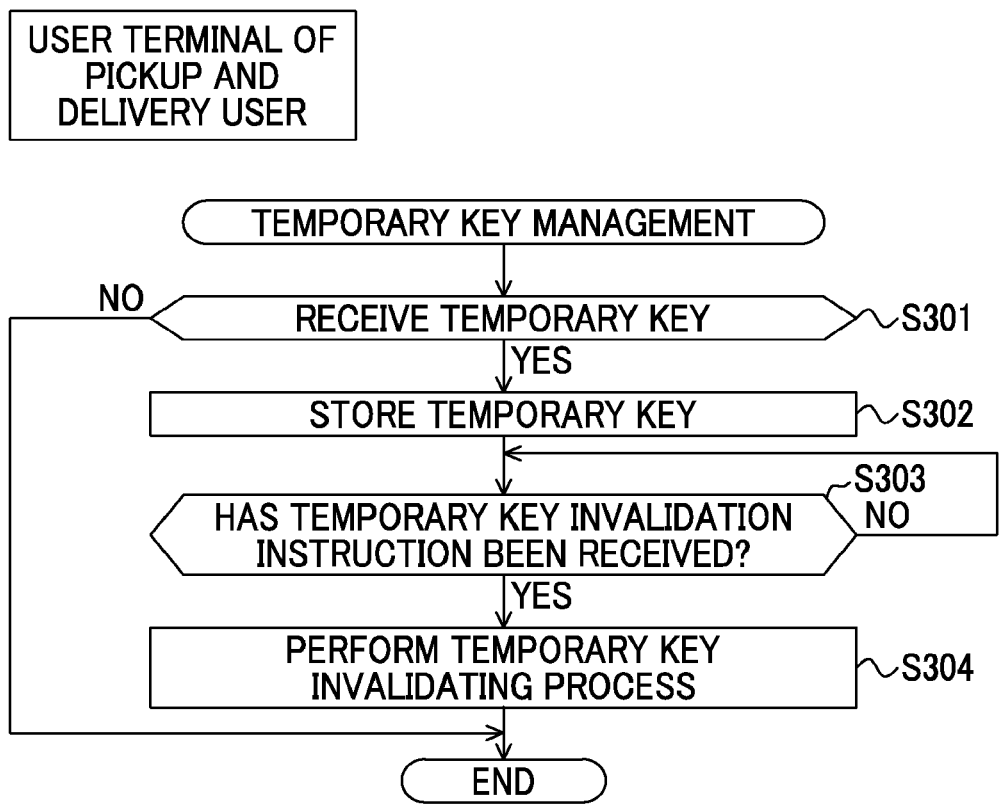
FIG. 8 is a flowchart illustrating a temporary key managing process which is performed by a user terminal of a pickup and delivery user according to the first embodiment of the disclosure.

FIG. 8 is a flowchart illustrating a process flow of a temporary key managing process which is performed by a user terminal 200 of a pickup and delivery user. The temporary key managing process is a process associated with management of the temporary key information in the user terminal 200. The process flow illustrated in FIG. 8 is performed, for example, at predetermined time intervals. The execution entity of the process flow illustrated in FIG. 8 is a computer corresponding to the control unit 203 of the user terminal 200 or a CPU mounted in the computer, but it is assumed that the authentication information managing unit 2031 which is a functional unit is used as an entity for the purpose of convenience.

In S301, the authentication information managing unit 2031 determines whether temporary key information has been received from the central server 400 via the pickup and delivery management server 500. The process flow transitions to S302 when the determination result of S301 is positive, and the process flow illustrated in FIG. 8 ends when the determination result is negative. In S302, the authentication information managing unit 2031 stores the received temporary key information in storage means provided in the control unit 203.

In S303, the authentication information managing unit 2031 determines an instruction to invalidate the temporary key information received in S301 has been received from the central server 400 via the pickup and delivery management server 500. When the determination result of S303 is positive, the process flow transitions to S304. When the determination result of S303 is negative, the process flow returns to S202. For example, when the validity period of the temporary key information has expired, the instruction to invalidate the temporary key information is transmitted from the central server 400.

In S304, the authentication information managing unit 2031 performs a temporary key information invalidating process. For example, the temporary key information invalidating process is a process of deleting the temporary key information from the storage means, setting up an invalidation flag for the temporary key information, or rewriting the validity period of the temporary key information to a past date and time. Thereafter, the process flow illustrated in FIG. 8 ends.

Figure 9:
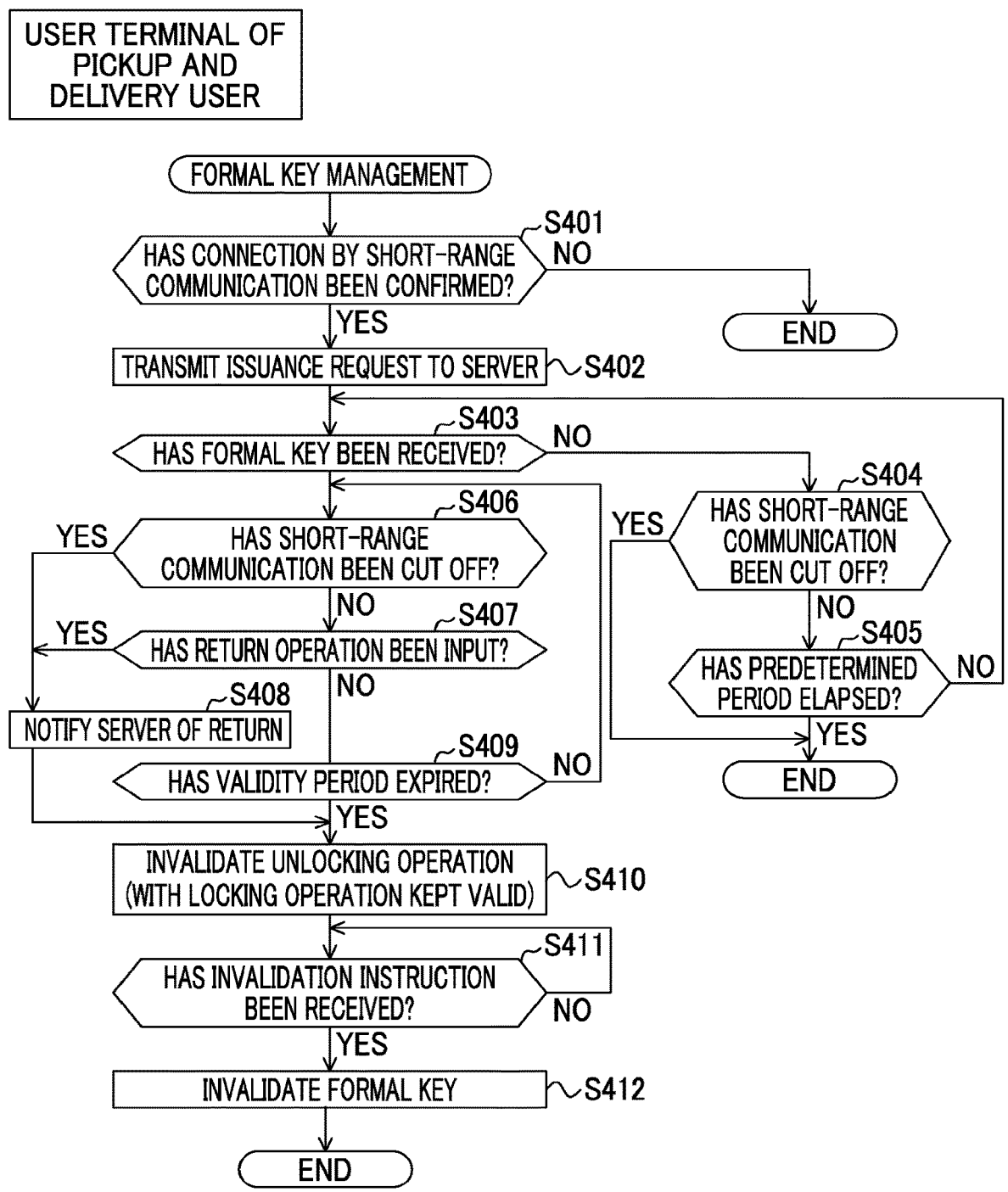
FIG. 9 is a flowchart illustrating a formal key managing process which is performed by a user terminal of a pickup and delivery user according to the first embodiment of the disclosure.

FIG. 9 is a flowchart illustrating a process flow of a formal key managing process which is performed by a user terminal 200 of a pickup and delivery user. The formal key managing process is a process associated with management of the formal key information in the user terminal 200. The process flow illustrated in FIG. 9 is performed, for example, at predetermined time intervals. The execution entity of the process flow illustrated in FIG. 9 is a computer corresponding to the control unit 203 of the user terminal 200 or a CPU mounted in the computer, but it is assumed that the authentication information managing unit 2031 which is a functional unit is used as an entity for the purpose of convenience.

In S401, the authentication information managing unit 2031 determines whether the short-range communication unit 201 has been connected to the key unit 100 of the vehicle 10 by short-range communication. The process flow transitions to S402 when the determination result of S401 is positive, and the process flow illustrated in FIG. 9 ends when the determination result is negative. Information which is used for connection to the key unit 100 of the vehicle 10 by short-range communication is transmitted along with the temporary key information. Accordingly, in the first embodiment, the user terminal 200 not including the temporary key information for the vehicle 10 cannot be connected to the key unit 100 of the vehicle 10 by short-range communication and thus cannot issue a formal key information issuance request. That is, in order for the user terminal 200 to issue the formal key information issuance request, it is necessary to include the temporary key information.

In S402, the authentication information managing unit 2031 transmits a formal key information issuance request to the central server 400 via the pickup and delivery management server 500. Along with the formal key information issuance request, for example, identification information of the user terminal 200 as an issuance request source and identification information of baggage to be picked up and delivered are also transmitted. In S403, the authentication information managing unit 2031 determines whether the formal key information has been received from the central server 400 via the pickup and delivery management server 500. The process flow transitions to S406 when the determination result of S403 is positive, and the process flow transitions to S404 when the determination result is negative.

In S404, the authentication information managing unit 2031 determines whether short-range communication with the key unit 100 of the vehicle 10 has been cut off. When the determination result of S404 is positive, the process flow illustrated in FIG. 9 ends. When the determination result of S404 is negative, the process flow transitions to S405. In S405, the authentication information managing unit 2031 determines whether a predetermined time has elapsed from transmission of the formal key information issuance request. The predetermined time in S405 is, for example, the same length as the validity period of the formal key information and ranges from 5 minutes to 30 minutes. When the determination result of S405 is positive, the process flow illustrated in FIG. 9 ends. When the determination result of S405 is negative, the process flow transitions to S403. That is, when the short-range communication has been cut off or the predetermined time has elapsed from transmission of the formal key information issuance request without receiving the formal key information, the process flow illustrated in FIG. 9 ends.

The processes of S406 to S412 are processes when the formal key information has been received. In S406, the authentication information managing unit 2031 determines whether short-range communication with the key unit 100 of the vehicle 10 has cut off. The process flow transitions to S408 when the determination result of S406 is positive, and the process flow transitions to S407 when the determination result is negative.

In S407, the authentication information managing unit 2031 determines whether a formal key information returning operation has been input from the input and output unit 204. The formal key information returning operation is, for example, an operation input for completion of pickup and delivery of baggage. The process flow transitions to S408 when the determination result of S407 is positive, and the process flow transitions to S409 when the determination result is negative.

In S408, since the short-range communication with the key unit 100 of the vehicle 10 has been cut off or the formal key information returning operation has been input, the authentication information managing unit 2031 transmits a formal key information return notification to the central server 400 via the pickup and delivery management server 500.

In S409, the authentication information managing unit 2031 determines whether the validity period of the formal key information has expired. The process flow transitions to S410 when the determination result of S409 is positive, and the process flow transitions to S406 when the determination result is negative.

In S410, the authentication information managing unit 2031 invalidates an unlocking operation on the vehicle 10. A locking operation on the vehicle 10 is kept valid. Specifically, the authentication information managing unit 2031 notifies the locking/unlocking control unit 2032 of invalidation of the unlocking operation, and the locking/unlocking control unit 2032 invalidates the unlocking operation even when the unlocking operation on the vehicle 10 is input from the input and output unit 204.

In S411, the authentication information managing unit 2031 determines whether a formal key information invalidation instruction has been received from the central server 400 via the pickup and delivery management server 500. When the determination result of S411 is positive, the process flow transitions to S412. When the determination result of S411 is negative, the process flow returns to S411. For example, when the unlocking invalidation period (see FIG. 7) has expired, the formal key information invalidation instruction is transmitted from the central server 400.

In S412, the authentication information managing unit 2031 performs a formal key information invalidating process. The formal key information invalidating process is, for example, a process of deleting the formal key information from the storage means, setting up an invalidation flag for the formal key information, rewriting the validity period of the formal key information to a past date and time, or not transmitting terminal authentication information included in the formal key information to the vehicle 10. Thereafter, the process flow illustrated in FIG. 9 ends.

Specific Example

Figure 10A:
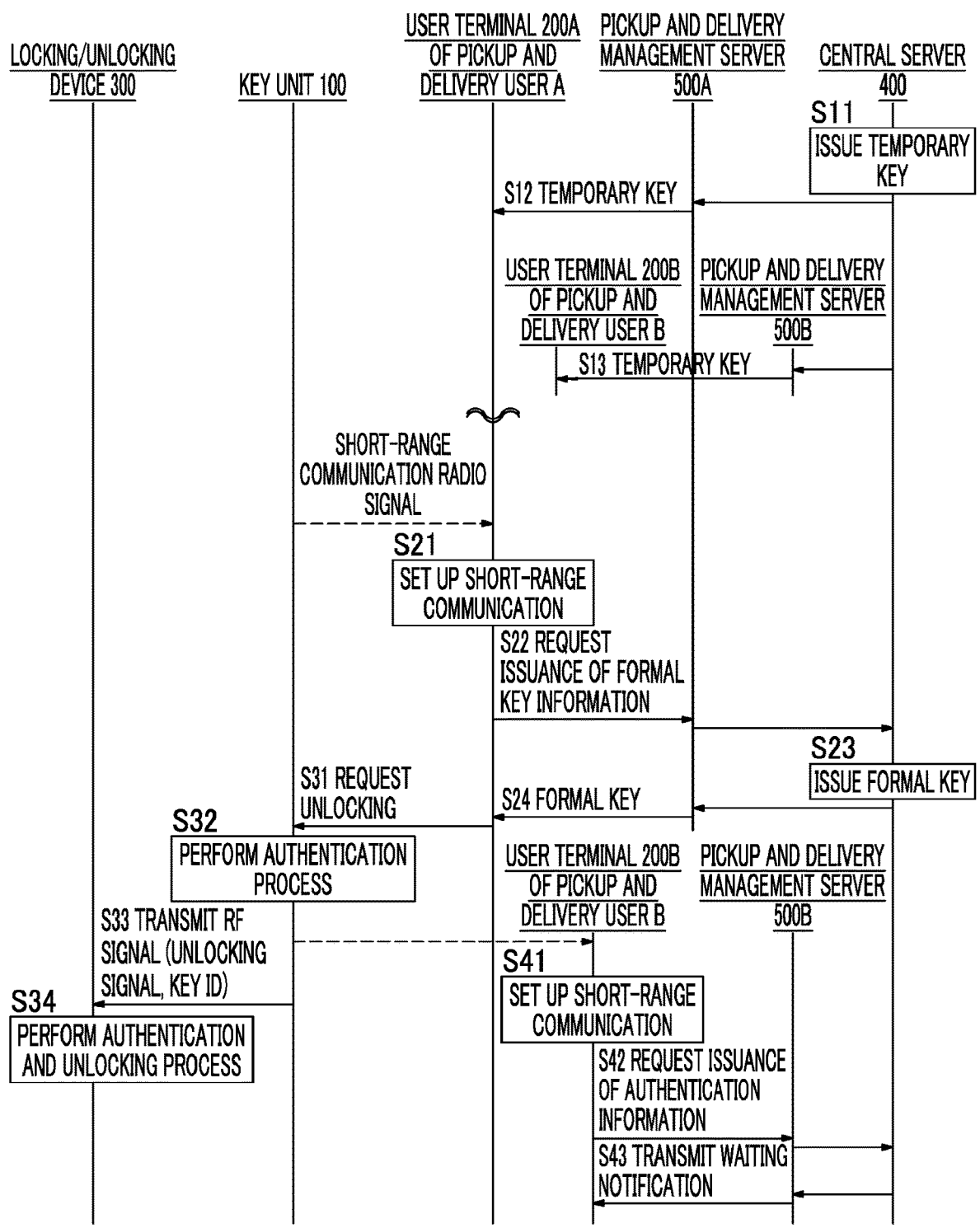
FIG. 10A is a diagram illustrating an example of a process sequence in a specific example of authentication information issuance control which is performed by the central server.

FIGS. 10A and 10B are diagrams illustrating an example of a process sequence in a specific example of authentication information issuance control in the central server 400. In FIGS. 10A and 10B, a case in which request users transmit pickup and delivery requests to a pickup and delivery management server 500A and a pickup and delivery management server 500B using terminals 50 and a pickup and delivery user A and a pickup and delivery user B pick and deliver baggage of which pickup and delivery are requested by the request users is illustrated. In the example illustrated in FIGS. 10A and 10B, it is assumed that a pickup and delivery time period is not designated and the pickup and delivery user A and the pickup and delivery user B belong to different delivery companies.

In S11, the central server 400 receives temporary key information issuance requests for target baggage from the pickup and delivery management server 500A and the pickup and delivery management server 500B and issues temporary key information to the user terminals 200 of the pickup and delivery user A and the pickup and delivery user B (S101 to S103 in FIG. 6). In S12, the user terminal 200A of the pickup and delivery user A receives temporary key information for a vehicle 10 from the central server 400 via the pickup and delivery management server 500A. In S13, the user terminal 200B of the pickup and delivery user B receives temporary key information for the vehicle 10 from the central server 400 via the pickup and delivery management server 500B. Although not illustrated, temporary key information issuance notifications corresponding to S12 and S13 are transmitted to a user terminal 50 of a request user from the central server 400.

The processes of S21 and subsequent thereto are processes on a scheduled delivery day. In S21, the pickup and delivery user A reaches an area in which short-range communication with the vehicle 10 is possible, the user terminal 200A of the pickup and delivery user A is connected to the key unit 100 of the vehicle 10 by short-range communication, for example, using information received along with the temporary key information (YES in S401 in FIG. 9). In S22, the user terminal 200A of the pickup and delivery user A transmits a formal key information issuance request to the central server 400 via the pickup and delivery management server 500A (S402 in FIG. 9).

In S23, since formal key information for the vehicle 10 has not been issued to any user terminal 200, the central server 400 transmits formal key information to the user terminal 200A of the pickup and delivery user A via the pickup and delivery management server 500A (NO in S203 and S205 in FIG. 7).

In S24, the user terminal 200A of the pickup and delivery user A receives the formal key information for the vehicle 10 from the central server 400 via the pickup and delivery management server 500A (YES in S403 in FIG. 9). When the formal key information transmitted from the central server 400 is received by the user terminal 200A in this way, an operation of locking and unlocking a cargo compartment of the vehicle 10 can be performed using the user terminal 200A.

The processes of S31 to S34 are processes when the pickup and delivery user A reaches the vehicle 10 within the validity period of the formal key information and picks up and delivers target baggage. In S31, when the pickup and delivery user A performs an operation of unlocking the vehicle 10 via the input and output unit 204 of the user terminal 200A, the user terminal 200A transmits an unlocking request including authentication information to the key unit 100. In S32, the key unit 100 receives an unlocking request transmitted from the user terminal 200A of the pickup and delivery user A and performs an authentication process by comparing authentication information (terminal authentication information (formal key information)) included in the unlocking request with authentication information (device authentication information) stored in the storage unit 1041.

In S33, when authentication using both pieces of authentication information has succeeded, the key unit 100 transmits an unlocking signal and a key ID to the locking/unlocking device 300. In S34, the locking/unlocking device 300 receives the unlocking signal and the key ID transmitted from the key unit 100, performs an authentication process based on the received key ID, and unlocks the cargo compartment of the vehicle 10 when the authentication has succeeded. At this time, the locking/unlocking device 300 may return an answerback or the like to the key unit 100.

The processes of S31 to S34 are performed in the vehicle 10. On the other hand, in S41, the pickup and delivery user B reaches an area in which short-range communication with the vehicle 10 is possible and the user terminal 200B of the pickup and delivery user B is connected to the key unit 100 of the vehicle 10 by short-range communication using information which is received along with the temporary key information (YES in S401 in FIG. 9). In S42, the user terminal 200B of the pickup and delivery user B transmits a formal key information issuance request to the central server 400 via the pickup and delivery management server 500B (S402 in FIG. 9).

In S43, since formal key information for the vehicle 10 has been already issued to the user terminal 200A of the pickup and delivery user A (YES in S203 in FIG. 7), the central server 400 transmits a waiting notification to the user terminal 200B of the pickup and delivery user B via the pickup and delivery management server 500B (S204 in FIG. 7).

In S51 in FIG. 10B, when the pickup and delivery user A completes pickup and delivery of baggage in the vehicle 10, closes the cargo compartment door through an unlocking process, and performs an operation of locking the vehicle 10 via the input and output unit 204 of the user terminal 200A, the user terminal 200A transmits a locking request including authentication information to the key unit 100. In S52, the key unit 100 receives the locking request transmitted from the user terminal 200A and performs an authentication process by comparing the authentication information (terminal authentication information (formal key information)) included in the locking request transmitted from the user terminal 200A with authentication information (device authentication information) stored in the storage unit 1041.

In S53, when authentication using both pieces of authentication information has succeeded, the key unit 100 transmits a locking signal and a key ID to the locking/unlocking device 300. In S54, the locking/unlocking device 300 receives the locking signal and the key ID transmitted from the key unit 100 and performs an authentication process based on the received key ID. As a result, when the authentication has succeeded, the cargo compartment door of the vehicle 10 is locked. In S35, the key unit 100 transmits a notification indicating that locking has been completed (a locking notification) to the user terminal 200. Accordingly, for example, a message indicating that locking has been completed is output onto a touch panel screen of the user terminal 200A.

In S61, when the pickup and delivery user A confirms that pickup and delivery of baggage has been completed through the locking notification displayed on the touch panel screen, the pickup and delivery user A inputs a latest pickup and delivery status, that is, a status indicating that pickup and delivery has completed, via the input and output unit 204 of the user terminal 200A in order to update the pickup and delivery status in pickup and delivery information stored in the pickup and delivery management server 500A. In S62, the user terminal 200A of the pickup and delivery user A transmits the latest pickup and delivery status to the pickup and delivery management server 500A. In S63, the pickup and delivery management server 500A having received the latest pickup and delivery status updates the pickup and delivery information. In updating the pickup and delivery status, instead of causing the pickup and delivery user to input the information, when the user terminal 200A receives a locking notification from the key unit 100 in the process of S55, the user terminal 200A may transmit an update command to the pickup and delivery management server 500 such that the pickup and delivery status is completion of pickup and delivery without requiring an input from the pickup and delivery user.

In S64, the user terminal 200A of the pickup and delivery user A receives a status of completion of pickup and delivery in S61 and transmits a formal key information return notification to the central server 400 via the pickup and delivery management server 500A (YES in S407 and S408 in FIG. 9). In S65, the central server 400 receives the formal key information return notification from the user terminal 200A of the pickup and delivery user A, starts an unlocking invalidation period, and waits until the unlocking invalidation period expires.

In S66, the unlocking invalidation period expires and the central server 400 performs a formal key information invalidating process (YES in S208 and S209 in FIG. 7). In S67, the central server 400 transmits a formal key information invalidation instruction to the user terminal 200A of the pickup and delivery user A via the pickup and delivery management server 500A. In S68, the user terminal 200A of the pickup and delivery user A receives the formal key information invalidation instruction and performs the formal key information invalidating process (YES in S411 and S412 in FIG. 9).

In S71, since exclusive owning of the formal key information for the vehicle 10 by the user terminal 200A of the pickup and delivery user A has expired, the central server 400 issues the formal key information for the vehicle 10 to the user terminal 200B of the pickup and delivery user B during waiting for formal issuance (YES in S210 and S205 in FIG. 7). In S72, the user terminal 200B of the pickup and delivery user B receives the formal key information for the vehicle 10 from the central server 400 via the pickup and delivery management server 500B (YES in S403 in FIG. 9). Thereafter, as in S31 to S34 and S51 to S55 illustrated in FIG. 10A, when the pickup and delivery user B arrives at the vehicle 10, locking and unlocking of the cargo compartment of the vehicle 10 is performed by causing the pickup and delivery user B to operate the user terminal 200B, and pickup and delivery of baggage is performed.

Operational Advantages of First Embodiment

In the first embodiment, temporary key information is issued to a user terminal 200 in advance on a scheduled delivery day, and formal key information is issued to the user terminal 200 when the user terminal 200 to which the temporary key information has been issued is connected to the vehicle 10 by short-range communication, that is, when the distance between the user terminal 200 and the vehicle 10 becomes a distance at which short-range communication therebetween is possible. However, when formal key information for the vehicle 10 has been already issued to another user terminal 200, formal key information for the vehicle 10 is issued to the user terminal 200 after ending of use of the formal key information by the other user terminal 200 has been detected.

Accordingly, according to the first embodiment, a user terminal 200 to which temporary key information has not been issued cannot acquire formal key information, and a user terminal 200 which earlier approaches the vehicle 10 among a plurality of user terminals 200 to which temporary key information has been issued can exclusively own the formal key information for about 5 minutes to 30 minutes. Accordingly, as long as the temporary key information has been issued to a user terminal 200, the user terminal 200 can acquire formal key information at a time at which it approaches the vehicle 10 without being temporally restricted, and temporal restriction to pickup and delivery of a pickup and delivery user is reduced.

By issuing temporary key information to a plurality of user terminals 200, pickup and delivery users of the plurality of user terminals 200 can access the cargo compartment of the vehicle 10 in a single pickup and delivery time period, and a request user can designate one pickup and delivery time period and give a plurality of pickup and delivery requests.

When the distance between a user terminal 200 and the vehicle 10 becomes a distance at which short-range communication is possible and formal key information for the vehicle 10 has been issued to another user terminal 200, the user terminal 200 can acquire formal key information for the vehicle 10 by waiting for ending of use of formal key information by the other user terminal 200. In the specific example illustrated in FIGS. 10A and 10B, for example, when 5 minutes is required for pickup and delivery in the vehicle 10 and the unlocking invalidation period is set to 5 minutes, the time from S21 to S68 in which the user terminal 200A exclusively owns the formal key information for the vehicle 10 is 10 minutes at most. That is, in the specific example illustrated in FIGS. 10A and 10B, even when accesses of the user terminal 200A and the user terminal 200B to the vehicle 10 overlap, the user terminal 200B can access the vehicle 10 at most 10 minutes after. A validity period of 5 minutes to 30 minutes is provided in the formal key information and use of the formal key information is considered to end when the validity period has expired. That is, according to the first embodiment, it is possible to reduce the time in which one user terminal 200 exclusively owns formal key information for the vehicle 10 and to improve a degree of freedom in pickup and delivery in the vehicle 10 by a plurality of pickup and delivery users. Accordingly, for example, a request user can designate pickup and delivery in the vehicle 10 for a plurality of pickup and delivery users in a time period from 12:00 to 14:00.

According to the first embodiment, an unlocking invalidation period is set after ending of use of the formal key information by the user terminal 200 has been detected. Accordingly, in the unlocking invalidation period, the user terminal 200 can continuously own the formal key information and cannot unlock the cargo compartment of the vehicle 10 but lock the cargo compartment. For example, when the validity period of the formal key information has expired in a state in which the cargo compartment of the vehicle 10 is unlocked for pickup and delivery of baggage, the pickup and delivery user can lock the cargo compartment of the vehicle in the unlocking invalidation period and thus it is possible to maintain security of the vehicle 10.

In the first embodiment, information which is used for short-range communication with the key unit 100 of the vehicle 10 is transmitted to the user terminal 200 along with temporary key information. A validity period on a scheduled pickup and delivery date is provided in the temporary key information. Accordingly, it is possible to limit a time in which a user terminal 200 of a pickup and delivery user can access the vehicle 10 by short-range communication and to maintain security.

Modified Example of First Embodiment

In the first embodiment, for example, when baggage arrives at a delivery center or when a pickup and delivery request has been received from a user terminal 50 of a request user, a temporary key information issuance request is transmitted and temporary key information is issued, and formal key information is issued with connection of a user terminal 200 of a pickup and delivery user to the key unit 100 of the vehicle 10 by short-range communication as a trigger. Instead, in a modified example, temporary key information and formal key information are issued based on position information of the user terminal 200 of the pickup and delivery user and position information of the vehicle 10. In the first embodiment, the validity period of temporary key information is a relatively long time which is 24 hours from a business start time of the scheduled delivery date when the request user has not designated the pickup and delivery time period, but is set to 1 hour to 2 hours after the temporary key information has been issued in this modified example.

The position information of the user terminal 200 of the pickup and delivery user can be acquired, for example, by mounting a sensor that can acquire position information such as a global positioning system (GPS) in the user terminal 200. The position of the vehicle 10 is managed by the pickup and delivery management server 500 (see FIG. 4). In this embodiment, the user terminal 200 of the pickup and delivery user transmits position information to the central server 400 via the pickup and delivery management server 500 at predetermined intervals. The central server 400 issues temporary key information or formal key information based on the position information received from the user terminal 200 of the pickup and delivery user and the position information of the vehicle 10.

Figure 11:
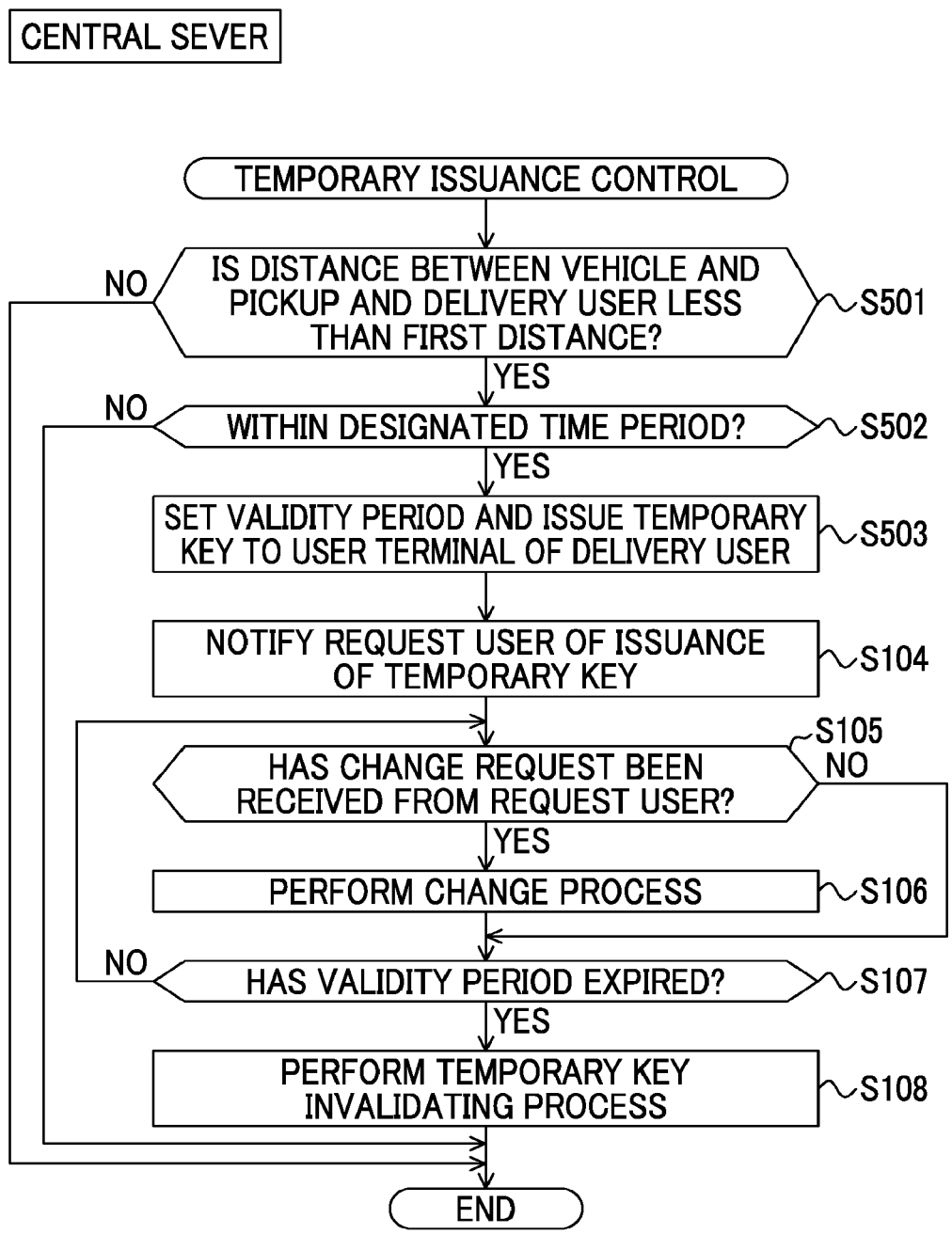
FIG. 11 is a flowchart illustrating a temporary issuance control process which is performed by a central server according to a modified example of the disclosure.

FIG. 11 is a flowchart illustrating a process flow of a temporary issuance control process which is performed by the central server 400 in this embodiment. In FIG. 11, the same processes as in the temporary issuance control process illustrated in FIG. 6 according to the first embodiment will be referred to by the same reference signs and description thereof will not be repeated.

In S501, the temporary issuance control unit 4021 determines whether a distance between the vehicle 10 and a user terminal 200 of a pickup and delivery user is less than a first distance based on the position information of the user terminal 200 of the pickup and delivery user. The first distance is set, for example, to 500 m to 1 km. The process flow transitions to S502 when the determination result of S501 is positive, and the process flow illustrated in FIG. 11 ends when the determination result is negative.

In S502, the temporary issuance control unit 4021 determines whether the current time is within a designated pickup and delivery time period of baggage to be picked up and delivered by the pickup and delivery user of the user terminal 200. When a pickup and delivery time period is not designated, the determination result of S502 is positive. The process flow transitions to S503 when the determination result of S502 is positive, and the process flow illustrated in FIG. 11 ends when the determination result is negative.

In S503, the temporary issuance control unit 4021 sets a validity period of temporary key information and transmits the temporary key information to the user terminal 200. The validity period of the temporary key information is set, for example, to 1 hour to 2 hours. The subsequent processes of S104 to S108 are the same as the processes of S104 to S108 illustrated in FIG. 6 and the temporary key information is invalidated when the validity period expires.

FIG. 12 is a flowchart illustrating a process flow of a formal issuance control process which is performed by the central server 400 according to this modified example. In FIG. 12, the same processes as in the formal issuance control process illustrated in FIG. 7 according to the first embodiment will be referred to by the same reference signs and description thereof will not be repeated.

In S601, the formal issuance control unit 4022 determines whether a distance between a vehicle 10 and a user terminal 200 of a pickup and delivery user is less than a second distance based on position information of the user terminal 200 of the pickup and delivery user. The second distance is a distance less than the first distance and is set, for example, to 0 m to 10 m. The process flow transitions to S602 when the determination result of S601 is positive, and the process flow illustrated in FIG. 12 ends when the determination result is negative.

In S602, the formal issuance control unit 4022 determines whether temporary key information for the vehicle 10 is maintained. The process flow transitions to S202 when the determination result of S602 is positive, and the process flow illustrated in FIG. 12 ends when the determination result is negative. Thereafter, the processes of S202 to S210 are the same as the processes of S202 to S210 in FIG. 7, and the formal key information is invalidated when the unlocking invalidation period elapses after a formal key information return notification is received and the validity period expires.

According to this modified example, temporary key information is issued to a user terminal 200 of a pickup and delivery user when the pickup and delivery user enters an area within the first distance from the vehicle 10, and formal key information is issued to the user terminal 200 when the pickup and delivery user approaches the vehicle 10 and enters an area within the second distance from the vehicle 10. When information which is used for short-range communication with the key unit 100 of the vehicle 10 is transmitted along with the temporary key information, the time in which the user terminal 200 of the pickup and delivery user maintains the information can be reduced and thus it is possible to enhance security.

In this modified example, the central server 400 performs the process of determining a distance between a vehicle 10 and a user terminal 200 of a pickup and delivery user (S501 in FIG. 11 and S601 in FIG. 12), but an applicable embodiment of the present disclosure is not limited thereto. For example, the process of determining a distance between a vehicle 10 and a user terminal 200 of a pickup and delivery user (S501 in FIG. 11 and S601 in FIG. 12) may be performed by the user terminal 200. The user terminal 200 acquires position information of the vehicle 10 using delivery schedule information or the like. In this case, when it is determined that the distance between the vehicle 10 and the user terminal 200 is less than the first distance, the user terminal 200 transmits a temporary key information issuance request to the central server 400 via the pickup and delivery management server 500. In this case, when the distance between the vehicle 10 and the user terminal 200 is less than the second distance, the user terminal 200 transmits a formal key information issuance request to the central server 400 via the pickup and delivery management server 500.

Others

For example, temporary key information may be issued before business start of a scheduled pickup and delivery date or during a business hour as in the first embodiment, and formal key information may be issued when the distance between the vehicle 10 and the user terminal 200 is less than the second distance as in the modified example. Alternatively, temporary key information may be issued when the distance between the vehicle 10 and the user terminal 200 is less than the first distance as in the second embodiment and formal key information may be issued when the user terminal 200 is connected to the key unit 100 of the vehicle 10 by short-range communication as in the first embodiment.

In the above-mentioned embodiment, when the user terminal 200 has returned the formal key information or when the validity period of the formal key information has expired, the user terminal 200 sets invalidation of an unlocking operation of the user terminal 200. Instead, when the central server 400 has received a formal key information return notification from the user terminal 200 or when the validity period of the formal key information has expired, the central server 400 may instruct the user terminal 200 to invalidate the unlocking operation.

In the above-mentioned embodiment, an upper limit is not set for the number of issued pieces of temporary key information for the vehicle 10, but an upper limit may be set for the number of issued pieces of temporary key information for the vehicle 10. The upper limit of the number of issued pieces of temporary key information may be set, for example, every day or ever hour. Accordingly, it is possible to limit the number of pickup and delivery users who can access the vehicle 10.

In the above-mentioned embodiment, an example in which the vehicle 10 is unlocked by the locking/unlocking device 300 when the authentication process in the key unit 100 has succeeded has been described above, but the locking/unlocking device 300 may perform the process in the key unit 100. That is, the locking/unlocking device 300 may include a control unit (ECU) for authenticating authentication information received from the user terminal 200, and the control unit may transmit an unlocking command or a locking command to the body ECU 304 via an onboard network such as a CAN when authentication of the user terminal 200 has succeeded. Accordingly, it is possible to enable pickup and delivery of baggage in the cargo compartment of the vehicle 10 with a simple configuration without installing the key unit 100.

In the above-mentioned embodiment, the user terminal 200 receives authentication information from the central server 400, a locking/unlocking signal is transmitted from the key unit 100 to the locking/unlocking device 300 when the user terminal 200 is authenticated by the key unit 100 based on the received authentication information, and the vehicle 10 is locked/unlocked. Instead, the authentication information may include information of a key ID for locking/unlocking the vehicle 10, not information for authenticating the user terminal 200.

In this case, the user terminal 200 receives authentication information including a key ID for locking/unlocking the vehicle 10 from the central server 400 via the pickup and delivery management server 500, and transmits the received key ID along with a locking/unlocking signal to the locking/unlocking device 300. The locking/unlocking device 300 compares the received key ID with a key ID stored in advance in the locking/unlocking device 300 and locks/unlocks the vehicle 10 when both key IDs coincide with each other. The key ID is transmitted and received in an encrypted state between the user terminal 200 and the central server 400 or the locking/unlocking device 300. The formal issuance control unit 4022 of the central server 400 may generate a one-time key, for example, by encrypting the key ID along with time information using a predetermined algorithm. The locking/unlocking device 300 decrypts the received one-time key using the same algorithm as in the central server 400 and compares the decrypted one-time key with the key ID stored in advance in the locking/unlocking device 300.

By including the one-time key generated from the key ID and the time information in the authentication information, the central server 400 can generate authentication information which is temporarily valid for each issuance request and transmit the generated authentication information to the user terminal 200.

In the above-mentioned embodiment, a system in which a vehicle 10 is used as a pickup and delivery place and authentication information for locking and unlocking the vehicle 10 is issued has been described above, but the application of the technique described in the embodiment is not limited thereto. For example, when an unmanned facility such as a garage, a warehouse, a safe, or a locker is configured to be lockable and unlockable using authentication information, the technique described in the embodiment may be applied to a system in which the facility is used as a pickup and delivery place and authentication information corresponding to the facility is issued. The facility is not limited to an unmanned facility but, for example, home or a work place of a request user may be included in the facility.

Recording Medium

A program causing a computer or other machine or device (hereinafter referred to as a computer or the like) to execute the above-mentioned issuance control can be recorded on a computer-readable recording medium. By causing the computer or the like to read and execute the program of the recording medium, the computer or the like can serves as the central server 400.

Here, a recording medium which can be read by a computer or the like refers to a non-transitory recording medium which can store information such as data or programs in an electrical, magnetic, optical, mechanical, or chemical action and be read by the computer or the like. Examples of the recording medium which can be detached from the computer or the like include a flexible disk, a magneto-optical disk, a CD-ROM, a CD-R/W, a DVD, a Blu-ray Disc, a DAT, a 8 mm tape, and a memory card such as a flash memory. Examples of the recording medium which is fixed to the computer or the like include a hard disk and a read only memory (ROM). A solid state drive (SSD) can be used as a recording medium which can be detached from the computer or the like and can also be used as a recording medium which is fixed to the computer or the like.

What is claimed is:

1. An authentication information control system that controls a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the authentication information control system comprising a control unit wherein:

the control unit is configured to issue temporary authentication information for disabling the locking/unlocking process using the locking/unlocking control device to a user terminal satisfying a first condition, and the control unit is configured to determine whether first authentication information has been issued to another user terminal when a distance between the user terminal to which the temporary authentication information has been issued and the vehicle or the facility becomes less than a first distance, to issue second authentication information to the user terminal to which the temporary authentication information has been issued when the first authentication information has not been issued to another user terminal, and to issue the second authentication information to the user terminal to which the temporary authentication information has been issued with detection of ending of use of the first authentication information in another user terminal as a trigger when the first authentication information has been issued to the other user terminal.

2. The authentication information control system according to claim 1, wherein the control unit is configured not to perform a process of invalidating the second authentication information on the user terminal until a predetermined time elapses after ending of use of the second authentication information in the user terminal has been detected.

3. The authentication information control system according to claim 2, wherein the user terminal invalidates an unlocking process using the locking/unlocking control device and validates a locking process in a period of time from detection of ending of use of the second authentication information in the user terminal to execution of the process of invalidating the second authentication information.

4. The authentication information control system according to claim 1, wherein the control unit is configured to set a validity period of the second authentication information at the same time as issuing the second authentication information to the user terminal and to detect ending of use of the second authentication information in the user terminal when the validity period expires.

5. The authentication information control system according to claim 1, wherein:

the control unit is configured to set a validity period of the temporary authentication information at the same time as issuing the temporary authentication information; and the control unit is configured
to determine whether a time remaining until the validity period of the temporary authentication information expires is less than a predetermined time length when the distance between the user terminal to which the temporary authentication information has been issued and the vehicle or the facility becomes less than the first distance, and
not to issue the second authentication information to the user terminal when the remaining time is less than the predetermined time length.

6. An authentication information control method of controlling a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the authentication information control method comprising:

issuing temporary authentication information for disabling the locking/unlocking process using the locking/unlocking control device to a user terminal satisfying a first condition;

determining whether first authentication information has been issued to another user terminal when a distance between the user terminal to which the temporary authentication information has been issued and the vehicle or the facility becomes less than a first distance; and issuing second authentication information to the user terminal to which the temporary authentication information has been issued when the first authentication information has not been issued to another user terminal, and issuing the second authentication information to the user terminal to which the temporary authentication information has been issued with detection of ending of use of the first authentication information in another user terminal as a trigger when the first authentication information has been issued to the other user terminal.

7. A non-transitory computer readable medium storing a program for controlling a user's access to a predetermined area in a vehicle or a facility in which baggage is accommodated and which is lockable and unlockable through a locking/unlocking process using a locking/unlocking control device by issuing predetermined authentication information for enabling the locking/unlocking process using the locking/unlocking control device to a user terminal of the user, the program causing a computer to perform a method, the method comprising:

issuing temporary authentication information for disabling the locking/unlocking process using the locking/unlocking control device to a user terminal satisfying a first condition;

determining whether first authentication information has been issued to another user terminal when a distance between the user terminal to which the temporary authentication information has been issued and the vehicle or the facility becomes less than a first distance; and issuing second authentication information to the user terminal to which the temporary authentication information has been issued when the first authentication information has not been issued to another user terminal, and issuing the second authentication information to the user terminal to which the temporary authentication information has been issued with detection of ending of use of the first authentication information in another user terminal as a trigger when the first authentication information has been issued to the other user terminal.

* * * * *